(12) United States Patent
Lusk et al.

(10) Patent No.: US 8,402,711 B2
(45) Date of Patent: Mar. 26, 2013

(54) MULTISTABLE SHAPE-SHIFTING SURFACES

(75) Inventors: Craig Perry Lusk, Lutz, FL (US); Paul Joseph Montalbano, St. Cloud, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 13/484,680

(22) Filed: May 31, 2012

(65) Prior Publication Data

US 2012/0234508 A1    Sep. 20, 2012

Related U.S. Application Data

(63) Continuation-in-part of application No. 13/302,606, filed on Nov. 22, 2011, which is a continuation of application No. PCT/US2011/044370, filed on Jul. 18, 2011.

(60) Provisional application No. 61/365,164, filed on Jul. 16, 2010, provisional application No. 61/537,372, filed on Sep. 21, 2011.

(51) Int. Cl.
*E04H 12/18* (2006.01)
*E04H 9/00* (2006.01)
*E04H 14/00* (2006.01)
*E04H 9/02* (2006.01)

(52) U.S. Cl. ............... 52/646; 52/1; 52/167.2; 160/236

(58) Field of Classification Search .............. 52/1, 2.11, 52/645, 646, 167.1, 167.2, 167.3, 167.4, 52/167.6, 167.7, 167.8; 160/236; 428/12; 434/365

See application file for complete search history.

(56) References Cited

U.S. PATENT DOCUMENTS

| | | | | |
|---|---|---|---|---|
| 5,642,590 A | * | 7/1997 | Skelton | .......................... 52/81.1 |
| 5,649,454 A | | 7/1997 | Midha et al. | |
| 5,727,391 A | * | 3/1998 | Hayward et al. | ................. 60/528 |
| 7,013,608 B2 | * | 3/2006 | Newland | .......................... 52/146 |
| 7,578,307 B2 | * | 8/2009 | Ung et al. | ...................... 135/128 |

(Continued)

FOREIGN PATENT DOCUMENTS

| | | | |
|---|---|---|---|
| JP | 2005287846 A | | 10/2005 |
| JP | 2008-031604 | * | 2/2008 |

OTHER PUBLICATIONS

Howell, L. L., Bistable Mechanisms. Compliant Mechanisms. 2001, Chapter 11, pp. 355-397.

(Continued)

*Primary Examiner* — Mark Wendell
(74) *Attorney, Agent, or Firm* — Nilay J. Choksi; Smith & Hopen, P.A.

(57) ABSTRACT

Multistable shape-shifting surfaces that retain their effectiveness as physical barriers while undergoing changes in shape and that can remain stable in the various shapes. The shape changes include any motion that makes the surface more effective at performing its function, such as expansion, shrinkage, twisting, encircling, wiggling, swallowing or constricting. The shape-shifting surfaces include tiled arrays of polygonal cells, each cell including specifically-designed compliant flexures attached to specifically-shaped overlapping thin plates or shells. The surfaces remain stable by leveraging them during deformation to an extent that they cannot spontaneously return to the unstressed shape. Applications for such surfaces include micro-scale cellular engineering and macro-scale biomedical applications, recreational uses, national security, and environmental protection.

17 Claims, 32 Drawing Sheets

U.S. PATENT DOCUMENTS

| | | | |
|---|---|---|---|
| 2004/0249582 A1 | 12/2004 | Allen et al. | |
| 2004/0261351 A1* | 12/2004 | Ung et al. | 52/693 |
| 2006/0285758 A1 | 12/2006 | Marugame | |
| 2008/0269948 A1 | 10/2008 | Solomon | |
| 2009/0263615 A1* | 10/2009 | Lanahan | 428/80 |
| 2010/0058704 A9* | 3/2010 | Liew et al. | 52/646 |
| 2010/0077674 A1* | 4/2010 | Johnson et al. | 52/81.1 |
| 2010/0133749 A1* | 6/2010 | Houlis | 273/153 S |
| 2011/0005160 A1* | 1/2011 | Nihei | 52/645 |
| 2012/0028743 A1* | 2/2012 | Muldoon et al. | 473/612 |

OTHER PUBLICATIONS

Jensen, B. D., and Howell, L. L., 2004, "Bistable Configurations of Compliant Mechanisms Modeled Sing Four Links and Translational Joints," Journal of Mechanical Design, University of Michigan, Ann Arbor, MI, Jul. 2004, vol. 126 pp. 657-666.

International Search Report for PCT/US2011/044370 (Filing date Jul. 18, 2011) with a mailing date of Mar. 28, 2012.

Jensen, B. D.; Howell, L. L. Identification of Compliant Pseudo-Rigid-Body Mechanism Configurations Resulting in Bistable Behavior. ASME 2000 Design Engineering Technical Conferences and Computers and Information in Engineering Conference, Baltimore, Maryland, Sep. 10-13, 2000, pp. 1-10.

Jensen, B. D.; Howell, L. L., Identification of Compliant Pseudo-Rigid-Body Four-Link Mechanism Configurations Resulting in Bistable Behavior. Journal of Mechanical Design. Dec. 2003, vol. 125, pp. 701-708.

Jenuwine, J. G., and Midha, A., Synthesis of Single-Input and Multiple-Output Port Mechanisms with Springs for Specified Energy Absorption. Journal of Mechanical Design, Trans. ASME, vol. 116, No. 3, Sep. 1994, pp. 937-943.

Dos Santos E Lucato, S. L.; Wang, J.; Maxwell, P.; Mcmeeking, R. M.; Evans, A. G., Design and demonstration of a high authority shape morphing structure. International Journal of Solids and Structures. 2004, vol. 41, pp. 3521-3543.

Masters, N. D., and Howell, L. L., A Self-Retracting Fully-Compliant Bistable Micromechanism, Journal of Microelectromechanical Systems, vol. 12, No. 3, Jun. 2003, pp. 273-280.

Murphy, M. D., MiIDHA, A., and Howell, L. L., Methodology for the Design of Compliant Mechanisms Employing Type Synthesis Techniques with Example, Mechanism Synthesis and Analysis: Proceedings of the 1994 ASME Mechanisms Conference, DE-vol. 70, 1994, pp. 61-66.

Nathan, R. H., A Constant Force Generation Mechanism, Journal of Mechanisms, Transmissions, and Automation of Design, Trans. ASME, vol. 107, Dec. 1985, pp. 508-512.

Opdahl P. G., Jensen, B. D., and Howell, L. L.,An Investigation Into Compliant Bistable Mechanisms, in Proc. 1998 ASME Design Engineering Technical Conferences, Atlanta, GA, Sep. 13-16, 1998.

Wicks, N.; Hutchinson, J. W., Sandwich Plates Actuated by a Kagome Planar Truss. Transactions of the ASME. Sep. 2004, vol. 71, pp. 652-662.

Howell, L. L., Midha, A., and Murphy, M. D., 1994, "Dimensional Synthesis of Compliant Constant-Force Slider Mechanisms," Machine Elements and Machine Dynamics: Proceedings of the 1994 ASME Mechanisms Conference, DE-vol. 71, pp. 509-515.

* cited by examiner

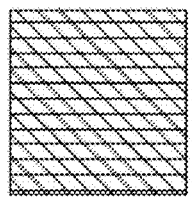 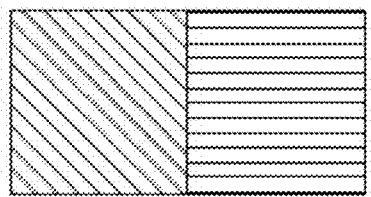 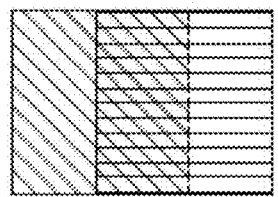
FIG. 3A  FIG. 3B  FIG. 3C
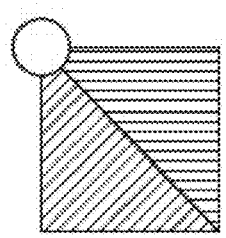 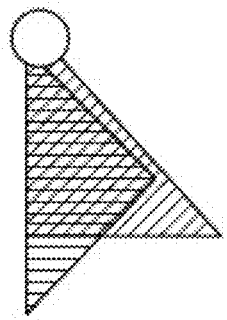 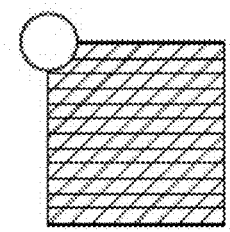
FIG. 4A  FIG. 4B  FIG. 4C
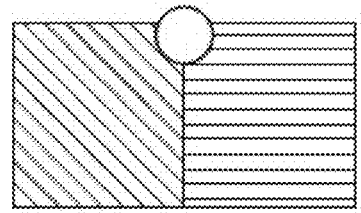
FIG. 4D

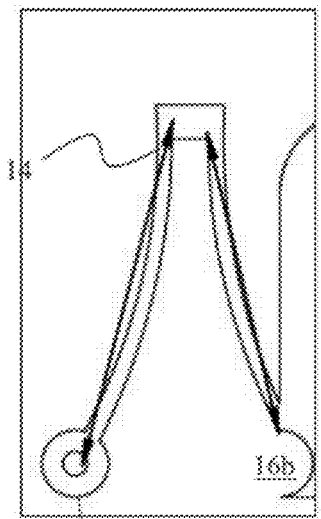
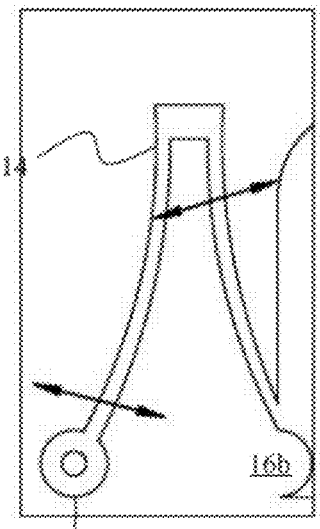
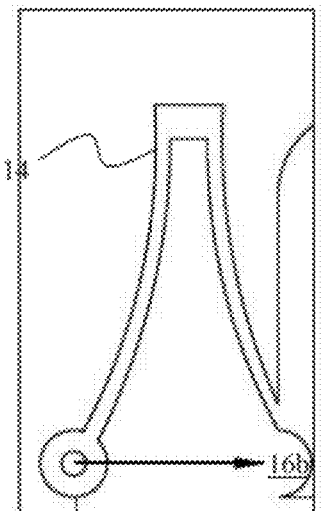
FIG. 6D    FIG. 6E    FIG. 6F
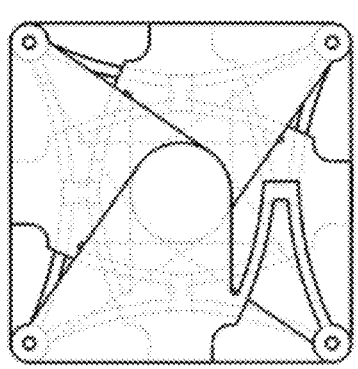
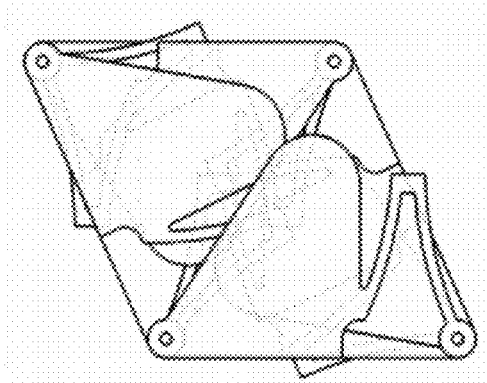
FIG. 7A    FIG. 7B

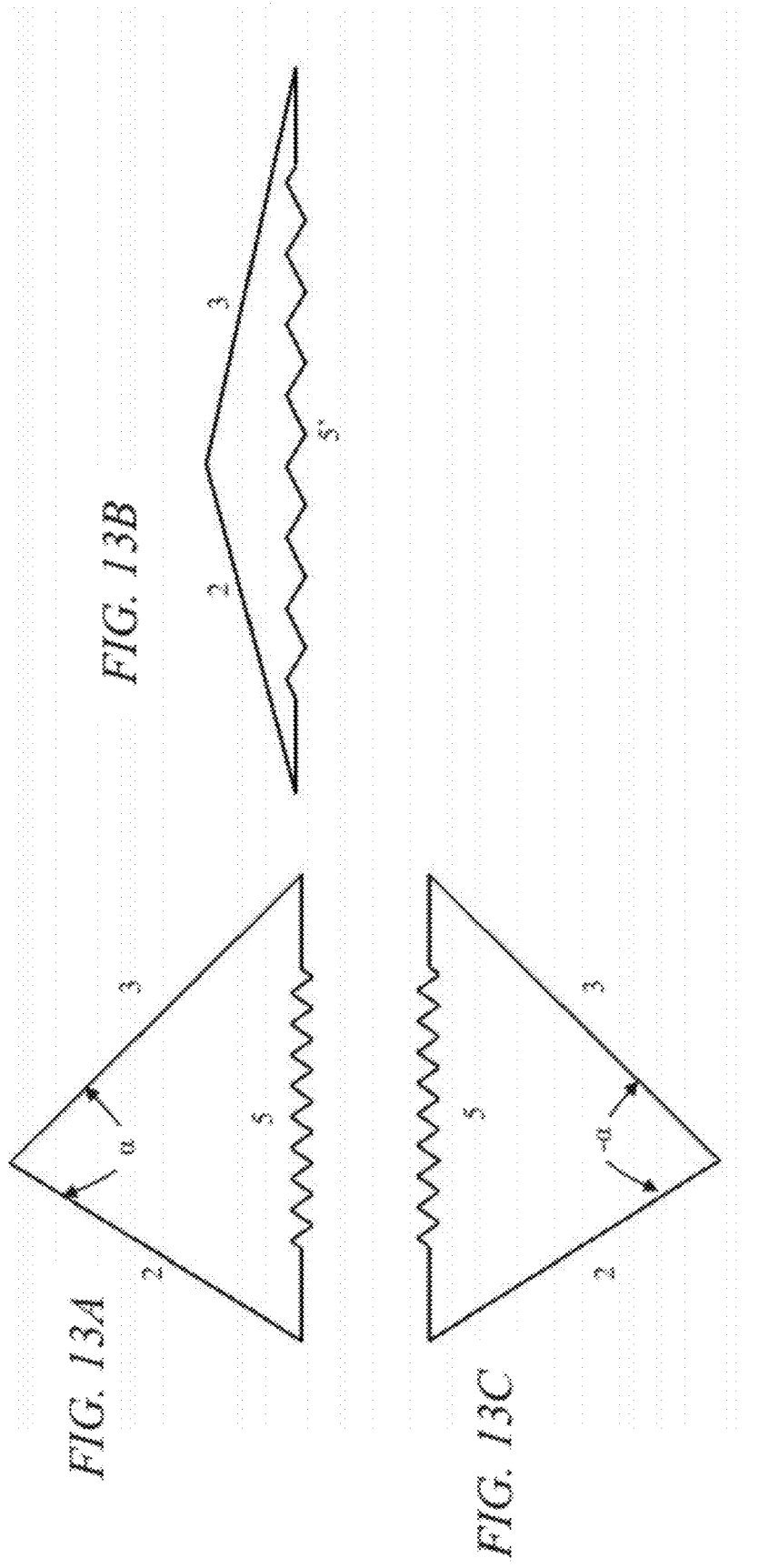

MULTISTABLE SHAPE-SHIFTING SURFACES

CROSS-REFERENCE TO RELATED APPLICATIONS

This application is a continuation-in-part of and claims priority to currently U.S. patent application Ser. No. 13/302,606 entitled "Shape-Shifting Surfaces," filed Nov. 22, 2011, which is a continuation of and claims priority to International Application Serial No. PCT/US2011/044370 entitled "Shape-Shifting Surfaces," filed Jul. 18, 2011, which claims priority to U.S. Provisional Application No. 61/365,164, entitled "Design for Integrity in Shape-Shifting Surfaces", filed Jul. 16, 2010, the contents of which are all hereby incorporated by reference into this disclosure. This application also claims priority to, and is a non-provisional of U.S. Provisional Application No. 61/537,372, entitled "Multistable Shape-Shifting Surfaces", filed on Sep. 21, 2011 by the same inventors, the contents of which are also hereby incorporated by reference into this disclosure.

FEDERALLY SPONSORED RESEARCH OR DEVELOPMENT

This invention was made with Government support under Grant No. CMMI 1000 138 awarded by the National Science Foundation. The government has certain rights in the invention.

BACKGROUND OF THE INVENTION

1. Field of the Invention

This invention relates, generally, to surfaces the shape of which can be changed in response to externally applied forces. More particularly, it relates to such surfaces that are dynamic, controllable and capable of having multiple phases of stability.

2. Description of the Prior Art

A compliant mechanism is a flexible mechanism, known to the art, that transfers an input force or displacement from one point to another through elastic body deformation. These mechanisms are most commonly designed in two ways. One is using pseudo-rigid-body models, and the other is using topology optimization. Both approaches have utility. The design of the compliant portion of the unit cell components is accomplished through compliant mechanism synthesis.

There are three major approaches to the design and synthesis of compliant mechanisms: kinematic approximation methods, computationally intense methods, and linear and higher-order expansions of the governing equations. This disclosure is based primarily upon kinematic approximation methods.

The kinematic approximation or Pseudo-Rigid-Body Model (PRBM) approach works by identifying similarities between compliant mechanisms and rigid-body mechanisms. It has proved effective in identifying numerous compliant analogues to ubiquitous planar rigid-body mechanisms such as four-bar and crank-slider mechanisms. The chief criticisms of this approach are that the models are approximate and have limited, albeit known, accuracy. Moreover, the identification between flexure geometries and rigid-body mechanisms has been limited to a small but versatile set of planar configurations.

Computationally intense approaches typically combine finite element analysis with optimization to calculate optimal geometries in response to load and motion specifications. This approach has been successful, but has also been criticized for producing results identical to those produced more quickly by the PRBM approach, or results that are not physically realizable. As a general rule, this approach is more capable and accurate than the PRBM approach, but also more time consuming.

The third approach, which relies on linear and higher-order expansions of the governing equations, is well-known in precision mechanisms research, and relies heavily on flexures that are small and undergo small, nearly linear, deflections. This approach uses flexures much smaller than the overall mechanism size, so it is not generally applicable to millimeter-scale and smaller mechanisms. These techniques are important but do not have a direct bearing on the invention disclosed herein.

Systems for subdividing surfaces in the development of finite element algorithms using node definition and degrees of freedom are known. These same subdivisions schemes are applicable to the design of the novel shape-shifting surfaces disclosed hereinafter. The prior art includes techniques for node placement in a given shape. For example, in Finite Element models, the behavior between nodes is typically determined by interpolating functions. In the multistable shape-shifting system disclosed hereinafter, a kinematic scheme is required to fill the gaps between nodes. Thus, kinematic skeletons are developed which have the same number of nodes (typically revolute joints) and the same number of degrees of freedom. Methods for enumerating all possible kinematic linkages with a given number of degrees of freedom are known. The simplest systems satisfying degree of freedom requirements are preferred. For example, triangular elements with additional nodes along the edges and centerpoint nodes are known.

Tiling systems, periodic and aperiodic, are methods for subdividing surfaces and as such have been extensively studied by mathematicians and artists since antiquity. The three regular tilings are: 1) equilateral triangles only, 2) squares only, and 3) regular hexagons only. There are eight Archimedian tilings, and there are aperiodic Penrose kite-and-dart tiling systems. The regular tilings are simple and require the fewest different types of unit cells. Some of the Archimedian tilings use polygons with several sides, yielding generous angles and areas to work with, which may be advantageous. Penrose tiles are specifically shaped quadrilaterals that can be assembled in multiple, non-periodic ways.

In 1827, Carl Fredrich Gauss published his 'Theorema Egregium' which is the foundational result in differential geometry. The basic result is that small triangles do not change their shape when bent and that there is a fundamental difference in the shape of triangles that are planar (the sum of the angles is equal to 180 degrees) and the shape of triangles on a sphere (the sum of the angles is always more than 180 degrees) and the shape of triangles on a hyperbolic or saddle-shaped surface (the sum of the angles is always less than 180 degrees). His result means that spheres cannot be made into planes without crumpling or tearing or stretching (distorting) the surface. This fundamental geometric limitation makes the building of certain types of curved surfaces (those with two non-zero principal curvatures) intrinsically more difficult than working with planar surfaces (both principal curvatures equal to zero) or developable surfaces (one principal curvature equal to zero).

A surface is defined as a material layer constituting such a boundary. Examples of this are walls, ceilings, doors, tables, armor, vehicle bodies, etc. However, in some cases, it may be valuable for these surfaces to change shape while still maintaining rigidity in the direction normal to the surface. In addition, having surfaces able to change between two different sizes on demand and stabilize in those sizes may be of even more value. One valuable application of size changing surfaces may be rigid containers, for example milk crates, trash barrels, dumpsters, laundry baskets, suit cases, truck beds, freight trains, trash compactors, etc. Such containers are designed for large volumes, however, when not in use, may become cumbersome. Thus, containers with large volumes when in use and small volumes when empty are of value. This includes the ability for containers to maintain large or small sizes both when in use and when empty.

This leads to a need for innovation that allows conventional surfaces to achieve new functionality, to be constructed more precisely, or at lower cost. More particularly, a low-cost modular building system with customizable degrees-of-freedom and stiffness with stability in multiple positions is needed. In addition to potential savings when a new barrier is erected, an innovative system would provide new methods and functionality to surfaces and objects.

Objects that function as physical bathers or supporting surfaces include walls, table tops, shelves, floors, ceilings, stairs, vehicle bodies, and pipelines. Conventional methods for constructing these barriers can be costly, but even when they are inexpensive, the numbers of these kinds of objects mean that they represent a significant economic investment. Such barriers often incur additional costs when they require modification or removal. Thus there is a need for a surface, and a method for designing such surface, having a shape that may be modified or adjusted without damaging the surface or rebuilding it, and that has stability in multiple positions or shapes.

However, in view of the art considered as a whole at the time the present invention was made, it was not obvious to those of ordinary skill how said art could be advanced.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

The long-standing but heretofore unfulfilled need for an improved, more effective and lower cost shape-shifting surface is now met by a new, useful, and nonobvious invention.

The novel multistable shape-shifting surfaces disclosed herein may include a single polygonal cell structure comprising multiple side members that have compliant flexures and plate or shell segments. The side members are attached at nodes to form structures that retain their effectiveness as physical line of sight barriers while undergoing changes in shape such as expansion, shearing, shrinkage, twisting, vibrating, encircling, wiggling, swallowing or constricting. The side members also allow stability in multiple directions. The side members can stabilize from one position to another with each stable position act like each other stable position.

The single polygonal cell structures may include overlapping thin plates, overlapping thin shells, or both.

The novel shape-shifting surfaces may also be formed of a tiled array of polygonal cells including compliant flexures attached to structures that retain their effectiveness as physical barriers while undergoing changes in shape such as expansion, shearing, shrinkage, twisting, vibrating, encircling, wiggling, swallowing or constricting. Such structures, when joined to multiple other cell structures, may further include a specific final shape such as a sphere, cuboctahedron, or other spatial structures.

Said tiled array structures may further include an initial planar structure and a specific final shape such as a sphere, cuboctahedron, or other spatial structures formed of compliant mechanisms including planar and non-planar compliant mechanisms.

The novel shape-shifting structure may further include a truncated icosahedron having planar or spherical faces, or both.

The novel method of incorporating shape-shifting surfaces in existing design tools includes the step of modeling a shape-shifting system cell using a single finite element for each unit cell, with material properties that are a known modification of the material used to fabricate the compliant portion of the unit cell so that a well-characterized shape-shifting system relates the properties of a unit cell to the properties of a geometrically similar element of bulk material.

An important object of this invention is to disclose shape-shifting surfaces, i.e., surfaces that retain their effectiveness as a physical bather while undergoing changes in shape and which maintain the relative integrity of a surface while changing the size of the area they cover.

There are different levels of barrier effectiveness such as line-of-sight (or radiation) barriers. Water-tight barriers and air-tight barriers may be achievable with the right choice of material, although it might be required to add layers that stretch, fold and perhaps crumple in order to accommodate the shape-changes.

Another object is to provide shape-shifting surfaces that provide changes in shape including expansion, shrinkage, twisting, encircling, swallowing, and constricting motions that make the surface more effective at performing its function.

Another object is to disclose compliant mechanisms that enable motion and provide a stable 'default' shape for a surface.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the nature and objects of the invention, reference should be made to the following detailed disclosure, taken in connection with the accompanying drawings, in which:

FIG. 3A depicts minimum area coverage of two identical squares;

FIG. 3B depicts maximum area coverage;

FIG. 3C depicts the preferred starting position, minimizing the deformation required to achieve both states of FIGS. 4A and 4B;

FIG. 4A depicts the smallest angles two links covering a square can have, allowing maximum contraction of the angle;

FIG. 4B depicts the ninety degree (90°) square corner of FIG. 4A compressed to forty five degrees (45°);

FIG. 4C depicts the corner members when they completely overlap;

FIG. 4D depicts the largest angles two links covering a square can have, representing the maximum expansion of the angle;

FIG. 6D depicts the bendable part of said compliant link with arrows depicting the direction of principle stiffness;

FIG. 6E depicts the bendable part of said compliant link with arrows depicting the direction of principle compliance;

FIG. 6F depicts the bendable part of said compliant link with arrows depicting how the node stays substantially on a straight line when said bendable part is displaced;

FIG. 7A depicts an unstressed square unit cell;

FIG. 7B depicts the unit cell with shear loads;

FIG. 13A depicts a representation of bistable behavior with initial unstretched spring;

FIG. 13B depicts a representation of bistable behavior as the spring of FIG. 13A is stretched to approach a collinear position;

FIG. 13C depicts a representation of bistable behavior as the spring of FIG. 13B crosses through the collinear position and becomes inverted;

DETAILED DESCRIPTION OF THE PREFERRED EMBODIMENT

Figure 1:
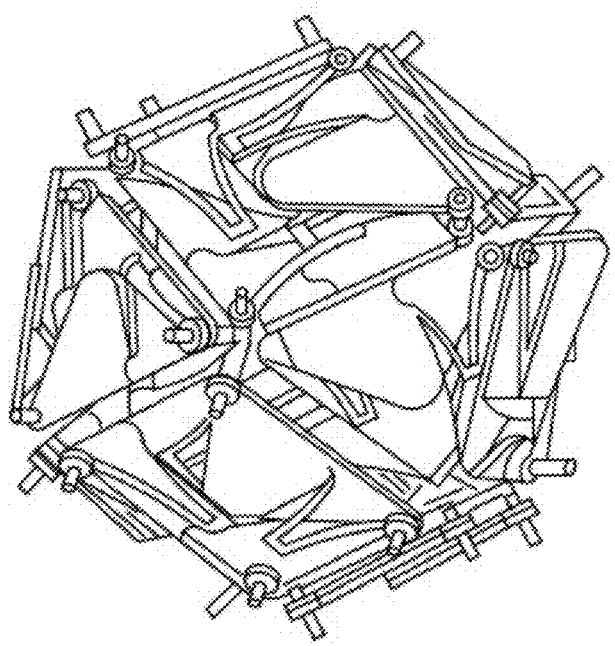
FIG. 1 depicts a foldable and deformable polyhedral (cuboctahedral) container made of shape-shifting surfaces.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

A multistable shape-shifting surface, a coined term, is a novel flat or curved surface that can change its shape (including its area and the orientation of internal lines), and stabilize within the resulting shape, while maintaining integrity against various forms of external assaults. Multistable shape-shifting surfaces have potential utility in products as diverse as containers, shielding, furniture, architectural elements, clothing, exercise equipment, and children's toys. For example, a truck bed could start off at a normal size and have the capability to expand to twice its volume by applying external force to expand the bed in its transverse direction. The truck bed can remain stable in that expanded position without spontaneously returning to the original position. Another example includes a cell phone screen that can expand to the size of a laptop computer screen, allowing for greater usability when space permits. The cell phone screen can remain in the expanded shape of a laptop computer screen by stabilizing in that position.

Multistable shape-shifting surfaces may also have applications in the fields of reconfigurable robotic systems such as claytronics, programmable matter, and digital clay. An important distinction is that multistable shape-shifting surfaces are functional without actuation. Multistable shape-shifting surfaces include compliant mechanisms so a rich variety of passive behaviors can be designed into them without the inherent expense of large numbers of actuators and processors. As used herein, the terms "compliant link" and "compliant mechanism" may be used interchangeably to refer to a flexible member that transfers an input force or displacement from one point to another through elastic body deformation. Use of compliant links allow for reduction in cost (e.g., part-count reduction, reduced assembly time, simplified manufacturing process) and increase in performance (e.g., increased precision, increased reliability, reduced wear, reduced weight, reduced maintenance) (Larry Howell, *Compliant Mechanisms*, Wiley-Interscience, $1^{st}$ ed. (2001)).

There are two types of compliant mechanisms. The first is called fully compliant mechanisms. These mechanisms have no joints, and therefore no links. They use only the deflection of compliant members to obtain their motion. The second type is called partially compliant mechanisms. These may contain one or more kinematic pairs, such as pins or sliders within the compliant portions. A link is defined as a continuum of matter connecting one or more kinematic pairs (Larry Howell, *Compliant Mechanisms*, Wiley-Interscience, $1^{st}$ ed. (2001)). A two-pin link may either be a binary link, which is a rigid link with no movement between two pins, or a structurally binary link, which is a compliant, or flexible link with two pin joints. When a structurally binary link is loaded only at its joints, it is said to be functionally binary. The SSS is composed of partially compliant links that are functionally binary.

Compliant mechanisms are well known in microelectromechanical systems (MEMS). MEMS devices use mechanical and electrical components on the micrometer and millimeter scale. MEMS are fabricated using planar layers of material. Assembly of MEMS at the micro scale tends to be very difficult. Compliant mechanisms offer solutions to this problem as they are easy to assemble and do not require many parts. Shape shifting surfaces are similar to the production of compliant MEMS in that they can be easily built using planar fabrication. Planar layers overlap and are attached with pins. Three-dimensional configurations of the SSS are possible using similar techniques as MEMS.

Because compliant mechanisms experience large, non-linear deformations, small-deflection force-deflection equations cannot be used. Elliptic integrals and topology optimization are sometimes used, however, require intense calculation and time. Therefore, a method of compliant mechanism analysis is using pseudo-rigid body models (Larry Howell, *Compliant Mechanisms*, Wiley-Interscience, $1^{st}$ ed. (2001)). Pseudo-rigid-body models offer a simplified technique for determining the motion of mechanisms undergoing large, nonlinear deflections. The compliant mechanism is analyzed as a rigid-body mechanism with equivalent force-deflection characteristics. To achieve this, joints, whose locations are determined by the pseudo-rigid-body model, are placed within a skeletal model to represent the kinematics of the compliant mechanism. Torsional springs are then added to these joints to mimic the stiffness of the flexible members in the compliant mechanism. The spring constant at each joint is determined by the geometry and material property of the compliant segment (Jensen, B. D., and Howell, L. L., 2004, "Bistable Configurations of Compliant Mechanisms Modeled Sing Four Links and Translational Joints," Journal of Mechanical Design, University of Michigan, Ann Arbor, Mich., pp. 657-665). Flexible segments can include, but are not limited to, small-length flexural pivots (living hinges), cantilever beam with force at free end, fixed guided, end-moment loaded cantilever, initially curved cantilever, and pinned-pinned segment (Larry Howell, *Compliant Mechanisms*, Wiley-Interscience, $1^{st}$ ed. (2001)).

The location of the pin's torsional spring is different for each geometry type and loading case, and is determined using the pseudo-rigid-body models. Each compliant segment can be modeled as a portion of a rigid-link mechanism and analyzed using rigid-link mechanism theory. "In this way, the pseudo-rigid-body model is a bridge that connects rigid-body mechanism theory and compliant mechanism theory" (Larry Howell, *Compliant Mechanisms*, Wiley-Interscience, $1^{st}$ ed. (2001)).

A flexible segment that can be used in the novel device is a small-length flexural pivot, or living hinge. This flexible segment is a thin, short-length compliant section that can be modeled as a kinematic pin. Because this segment is thin, it can be assumed to have minimal resistance and therefore minimal stress.

Three specific special-purpose mechanisms that can be used in compliant mechanisms are constant-force mechanisms, parallel-guiding mechanisms and bistable mechanisms. Other types of special-purpose mechanisms exist, but these three tend to have many possible applications.

A constant-force mechanism maintains a constant reaction force to an applied load throughout its entire motion. Designs for rigid-link constant-force mechanisms have been developed (Nathan, R. H., 1985, "A Constant Force Generation Mechanism," *Journal of Mechanisms, Transmissions, and Automation of Design*, Trans. ASME, Vol. 107, December Anonymous pp. 508-512; Jenuwine, J. G., and Midha, A., 1989, "Design of an Exact Constant Force Generating Mechanism," *Proceedings of the First National Applied Mechanisms and Robotics Conference*, Cincinnati, Ohio, Vol. II, Anonymous pp. 10B-4-1 to 10B-4-5; Jenuwine, J. G., and Midha, A., 1994, "Synthesis of Single-Input and Multiple- Output Port Mechanisms with Springs for Specified Energy Absorption," *Journal of Mechanical Design*, Trans. ASME, Vol. 116, No. 3, September Anonymous pp. 937-943). Constant-force springs have also been studied (Wah, A., 1963, "Mechanical Springs, $2^{nd}$ ed." McGraw-Hill, N.Y.), and produce a constant force as they are extended. Recently, compliance has been incorporated into constant-force mechanisms (Owell, L. L., Midha, A., and Murphy, M. D., 1994, "Dimensional Synthesis of Compliant Constant-Force Slider Mechanisms," *Machine Elements and Machine Dynamics: Proceedings of the 1994 ASME Mechanisms Conference*, DE-Vol. 71, Anonymous pp. 509-515; Murphy, M. D., Midha, A., and Howell, L. L., 1994, "Methodology for the Design of Compliant Mechanisms Employing Type Synthesis Techniques with Example," *Mechanism Synthesis and Analysis: Proceedings of the 1994 ASME Mechanisms Conference*, DE-Vol. 70, Anonymous pp. 61-66; Midha, A., Murphy, M. D., and Howell, L. L., 1995, "Compliant Constant-Force Mechanism and Devices Formed Therein," U.S. Pat. No. 5,649,454). Constant-force mechanisms can be incorporated into the novel device to allow constant reaction force as the device is deformed into its many possible shapes.

Parallel-guided mechanisms contain two opposing links that stay parallel through their entire motion. Examples of parallel-guided mechanisms are tackle boxes, desktop lamps, and playground swings. Compliant parallel-guiding mechanisms are designed to retain all the advantages associated with compliant mechanisms, including the elimination of joint friction, backlash, and the need for lubrication, in addition to a reduction in part count, weight, and assembly time (Howell, L. L., 2001, "Compliant Mechanisms," Wiley, N.Y.). Compliant parallel mechanisms can be used within the novel device to reduce the effect of rotation between nodes, giving pure translation.

A bistable mechanism is defined as a mechanism with two stable equilibrium positions separated by a peak in energy. Examples of bistable mechanisms include light switches, self-closing gates, cabinet hinges, and three-ring binders.

The novel multistable shape-shifting surface concept disclosed herein offers the first plausible workaround to Gauss's result: multistable shape-shifting surfaces can change their area because they have multiple layers which can slide with respect to each other. Thus, it functions as an integral surface, and can satisfy many of the practical expectations inherent in surfaces, but because of the multiplicity of layers it provides functionality that is not seen in any other structure or mechanism. Thus, a spherical globe made of multistable shape-shifting surfaces could potentially be opened and pressed flat into a flat map with stability in both the globe shape and the flat map shape, perhaps for educational purposes. Gaps or tears would open in a conventional surface (e.g., typical cardboard or metal globes). In an embodiment of the current invention, these gaps or tears would be filled by underlying layers being revealed as the surface was stretched flat. Because the stretching motions in a multistable shape-shifting surface are controlled by elastic members, the stretching motions are reversible, though not spontaneously if stabilized in that stretched position.

The different layers can snap, click or leverage into place to stabilize itself in a particular position. The layers are leveraged such that the mechanism used to spontaneously push the layers back into their original positions (e.g., a spring, elastic members) is no longer effective. An external force would be needed to push the layers back into original position.

The passive functionality of a multistable shape-shifting surface is a functionality that is designed in due to the geometry and material properties of the shape-shifting surface, rather than due to electronic sensors or actuators. As a new design paradigm, multistable shape-shifting surfaces may be components in improved reconfigurable robotic systems.

This disclosure discloses four design concepts associated with multistable shape-shifting surfaces: 1) Characterizing a shape-shifting surface unit cell as a finite element, thereby enhancing the feasibility of integrating the shape-shifting surface into existing designs and simplifying its analysis; 2) Establishing a kinematic and structural basis for shape-shifting, i.e., deforming the geometry of each cell, and using a rigid-body-replacement technique to identify compliant mechanisms with motions consistent with the kinematic structure; 3) Stabilizing the compliant mechanisms in at least a first position and a second position; and 4) Integrating unit cells into complex polygonal surfaces and shapes such as a cube or cuboctahedron, as depicted in FIG. 1.

Modeling the unit cell as a finite element requires consideration of design space characterization of the multistable shape-shifting system, node definition and degrees of freedom, and periodic or aperiodic tiling systems. Concerning design space considerations, designers are more likely to use a design innovation if it can be easily integrated into existing software and design procedures. Accordingly, the design space allows shape-shifting system designs to be easily assessed using existing tools. This is achievable because a multistable shape-shifting system cell can be modeled using a single finite element for each unit cell, with material properties that are a known modification of the material used to fabricate the compliant portion of the unit cell. Thus, a well-characterized shape-shifting system relates the properties of a unit cell to the properties of a geometrically similar element of bulk material. For example, an initial polypropylene cell prototype, designed for minimal stiffness, has one-fourth the density and $\frac{1}{1500}^{th}$ the in-plane stiffness of a uniform block of polypropylene with equal area and thickness. The ratio between the properties of the shape-shifting system cell and the bulk material allows designers to test concepts in standard design software using modified material properties.

A multistable shape-shifting surface has a specific initial shape but is made of a material that accommodates deformation of that shape in order to produce the desired shape-shifting property. There may be a specific initial shape, i.e., a planar arrangement such as an ellipse and a different specific final shape, i.e., a spatial figure such as a sphere or cuboctahedron as depicted in FIG. 1. Certain embodiments of the current invention can be stable in both the specific initial position and the specific final position when deformed.

Multistable shape-shifting surfaces have multiple subcomponents; accordingly, elastic members are necessary to give them a first stable shape. Without such elastic members, shape-shifting surfaces are too vulnerable to gravity and would collapse under their own weight. Leveraging the elastic members allows them to be shifted into another shape and leveraged into place to give them a second stable shape. This methodology may continue for more stable shapes.

Based on the properties of small triangular areas, mathematicians have recognized three basic categories of surfaces: hyperbolic surfaces, spherical surfaces and planar surfaces. Each type of surface can generally be subdivided into regular polygonal areas. Each of these regular polygons can be taken as a unit cell for the purposes of design. Systems of tiling for the three types of surfaces include regular, Archimedean, and Penrose tiling systems. Computer algorithms for generating these tiling systems are adapted for use in describing multistable shape-shifting surfaces.

The design of multistable shape-shifting surfaces may be accomplished using the approach taken in finite element analysis where the vertices of the unit cells are taken as nodes. For example, a simple planar square unit cell has four nodes, each node with two translational degrees of freedom, yielding eight degrees of freedom for the unit cell.

Figure 2A:
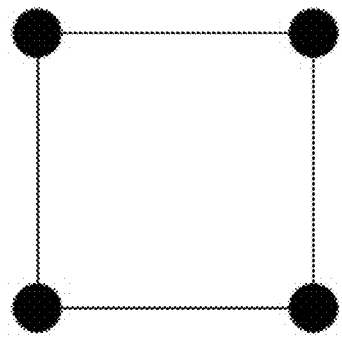
FIG. 2A depicts a square unit cell with four nodes.
Figure 2B:
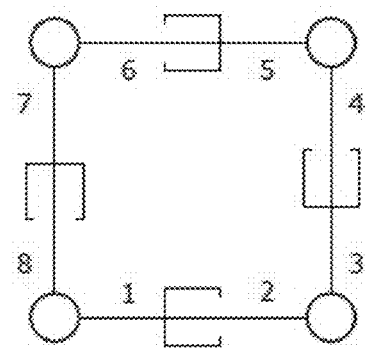
FIG. 2B depicts an eight-link kinematic skeleton model with the same number of degrees of freedom as the model of FIG. 3A.

Given the unit cell shape and its required degrees of freedom, kinematic skeleton models are constructed that result in the nodes having appropriate relative freedoms. A nodal model and a simple kinematic model, consisting of links, revolute joints and sliding joints, are depicted in FIGS. 2A and 2B, respectively. Connecting nodes with RPR (revolute, prismatic, revolute) joints allow complete freedom of motion between the nodes. More particularly, FIG. 2A depicts a square unit cell having four (4) nodes, and FIG. 2B depicts an eight-link kinematic skeleton model having the same number of degrees of freedom.

A polygon has a finite number of straight sides joined at corners which are known as the nodes of the unit cell. For example, a square has four corners, so a square unit cell has four nodes, as depicted in FIG. 2A. In the multistable shape-shifting surface, each side of a unit cell may change its length, as represented by the "]" symbols in FIG. 2B, and each angle may increase or decrease as represented by the "o" symbols in FIG. 2B. Each node can move independently relative to the other nodes. Each square has a particular structure that enables it to move and maintain its integrity. Two overlapping links form each side and produce this kinematic slider; this gives the unit cell a total of eight degrees-of-freedom, as seen in FIG. 2B. In order to maintain the square shape of the unit cell, these overlapping sliders must undergo linear deflections along the line of action connecting nodes. Therefore, four sets of two coupled sliders are formed together to produce the eight degree-of-freedom unit cell.

To define link shapes that preserve line-of-sight surface integrity under numerous conditions including non-uniform compression, expansion and shear, shapes are chosen for each of the links in the kinematic model so that as the links slide, rotate, and overlap, the unit cell serves, at the minimum, as a line-of-sight barrier for all points within the unit cell. At the same time, no piece of the links intrudes on adjacent unit cells, and the number of overlapping layers is minimized. This is done by overlapping sliding and rotating layers so that the unit cell can experience changes in area coverage in all three modes of deformation (compression, expansion, and shear) without compromising the line-of-sight coverage. In order to have this un-broken area coverage in both compression and expansion, the unit cell is divided into thirds so that the initial position is halfway between complete overlap and no overlap. This provides equal stress in tension and compression when expanded and compressed.

For the relative sliding motion of two squares, the minimum area of coverage occurs when they are coincident, as depicted in FIG. 3A, and the maximum area of coverage occurs when they are adjacent, as depicted in FIG. 3B. An initial position of half-way with a one-third overlapping area coverage allowing a one-third movement in each direction, as shown in FIG. 3C, is preferred because it permits the minimum deformation between minimum and maximum area coverage. The length change of each side is accomplished by a design in which each side of the unit cell contains two separate side members which can translate relative to each other, as depicted in FIGS. 3A-C, 4A-D and 5A-C.

Furthermore, the link shapes may be described as side members of a unit cell. FIG. 3A depicts one extreme of the relative motion of the sides where the two side members completely overlap one another. FIG. 3B depicts the other extreme in which the two side members osculate, but do not overlap. The two side members can be designed to have their initial relative position anywhere between the extremes shown in FIG. 3A and FIG. 3B.

In deference to the stresses associated with moving compliant portions of the multistable shape-shifting surface, an intermediate design with half of each member overlapping the other member, as depicted in FIG. 3C, is selected to illustrate a design in which the length of a side can both increase and decrease. In this particular intermediate design, the distances, i.e., the amount of relative translation between the two members, to the extremes depicted in FIGS. 3A and 3B, are equal. This halfway position yields a two-thirds rule, i.e., by making each side member two-thirds of the total width of the unit cell, the range of motion for each side ranges from two-thirds (the minimum width) to four-thirds (the maximum width) of the original length of the unit cell.

The sides can be subdivided further if desired. If X is the minimum width, and n is the number of side members, then the maximum width is nX. The midpoint length, Y, is found by averaging the minimum and maximum widths, $Y=(X+nX)/2$. Thus, if the unit cell width is equated to be the midpoint length, Y, then the length of each side member is given by $X=2Y/(n+1)$. The range of motion for each side is then given by $R=2Y(n-1)/n+1$. This equation assumes a minimum of two members but it gives a correct result when n=1, i.e., with a single side member, the range of motion for a side becomes zero.

Rotations can be approached similarly. FIG. 4A depicts the minimum pair of angles on links that cover a square. FIG. 4B depicts the maximum angle that can be subtended by two links fitting into a square. FIG. 4C depicts an intermediate design that fits into a square and permits both expansion and contraction of the angle marked with a small white circle. Combining the designs for sliding motion and rotation yields a link shape with sufficient overlaps to permit expansion, contraction and shearing motions, as illustrated in FIGS. 6A-F and 7A-D.

Figure 5A:
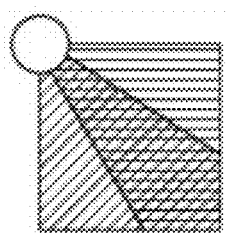
FIG. 5A depicts corners with equal capability to compress and expand.
Figure 5B:
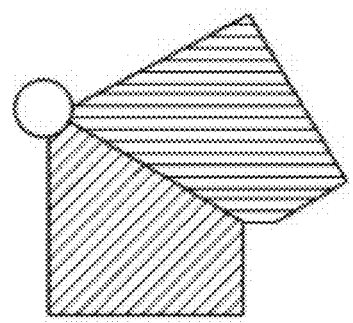
FIG. 5B depicts corners with equal capability to compress and expand.
Figure 5C:
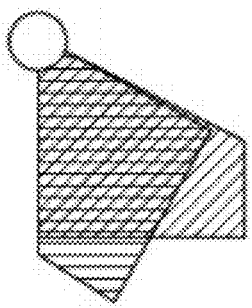
FIG. 5C depicts corners with equal capability to compress and expand.

Similar results can be obtained for the range of motion of a corner. A corner consisting of a single member is immobile, so two corner members, pinned at the corner can move with respect to each other. When two corner members are used, they can either osculate as shown in FIG. 4A, in which case they have the maximum capability to compress (e.g., the ninety degree (90°) square corner can compress to forty five degrees (45°) as depicted in FIG. 4B), or they can completely overlap as shown in FIG. 4C, in which case they have the maximum capability to expand. For example, the ninety degree (90°) square corner can expand to one hundred eighty degrees (180°) as shown in FIG. 4D. The two-thirds rule for sides can be used to obtain corners with equal capability to compress and expand, as depicted in FIGS. 5A-C.

For a corner that is originally ninety degrees (90°), the two-thirds rule suggests two members with sixty degree (60°) corners. Thus, the corner can expand to one hundred twenty degrees (120°), and compress to sixty degrees (60°), with stability in the sixty degree (60°), ninety degree (90°) or one hundred twenty degree (120°) positions, or all three positions individually.

These design rules disclose how to design sides and angles that can compress and expand without developing gaps or without protruding past the nodes. Following these rules produces multistable shape-shifting surface members that provide good coverage and a range of motion without gaps in the shape-shifting surface or protrusions outside of the unit cell. It also allows stability in various positions if desired.

To identify compliant mechanisms with motions consistent with the kinematic structure, kinematic models consisting of sliders and revolute joints are simplified and made easier to assemble by replacing rigid-link mechanisms with a compliant mechanism having the same motion. This process is known as compliant mechanism synthesis by rigid-body replacement.

Selecting a tiling scheme is one step of the design procedure for a shape-shifting surface. The tiles may be of regular configuration such as equilateral triangles, squares, or regular hexagons. They may also be Archimedean or even non-periodic such as Penrose tiles. In general, the selected tiling scheme will include a finite number of polygonal shapes that are repeated to fill an area. The polygons used in the tiling schemes are used to design each of the unit cells of a shape-shifting surface.

A system is in a state of equilibrium when it is experiencing no acceleration (Howell, L. L., *Compliant Mechanisms*, Wiley, N.Y., 2001). This can either be a stable equilibrium or an unstable equilibrium. When in a stable equilibrium, small external disturbances may cause the system to oscillate about its equilibrium. When in an unstable equilibrium, small external disturbances may cause divergence from the equilibrium state. A mechanism has a stable equilibrium position when the first derivative of the potential energy curve is zero and the second derivative of the potential energy curve is positive.

A mechanism has an unstable equilibrium position when the first derivative of the potential energy curve is zero and the second derivative of the potential energy curve is negative.

A mechanism has a neutrally stable equilibrium position when the first derivative of the potential energy curve is zero and the second derivative of the potential energy curve is also zero.

Because two local minima must always contain one local maximum between them, an unstable or neutrally stable position will always occur between any two stable states. The critical moment (i.e., the maximum load required for the mechanism to change stable states) may be found by evaluating the moment curve when the second derivative of potential energy is zero. The stiffness of a stable equilibrium position is equal to the value of the second derivative of potential energy at that position (Opdahl, P. G., Jensen, B. D., and Howell, L. L., 1998, "An Investigation Into Compliant Bistable Mechanisms," in Proc. 1998 *ASME Design Engineering Technical Conferences*, DETC98/MECH-5914, Anonymous).

Additionally, surface area coverage remains whole under its deformation among the unit cell's multiple stable positions, thereby preventing extrusions, gaps or holes in each stable position and throughout deformation. Generally the unit cell will have maximum displacement among stable positions while still maintaining complete surface area coverage. When the nodes are in motion, the nodes may begin and end on the same line of action, though it does not need a straight-line path.

A system with two stable positions is depicted in FIGS. 13A-C. Links 1, 2 and 3 form a triangle with unstretched spring, as depicted in FIG. 13A. Links 2 and 3 are separate by an angle α. FIG. 13B shows the system as α increases, forcing link 1 (i.e., the spring) to expand to allow links 2 and 3 to approach and pass through a collinear stage. Once links 2 and 3 pass through this collinear stage, the potential energy stored in link 1 forces links 2 and 3 to a second stable position with an angle of −α between links 2 and 3, as seen in FIG. 13C. In this second stable position, the spring is back to its unstretched, zero-energy state, and links 2 and 3 are inverted.

Shape-shifting surfaces may have two stable equilibrium positions (i.e., bistability), though using the device's tilling system, the surface may have more than two stable equilibrium positions. The two stable equilibrium positions may be separated by a peak in energy. Bistable compliant mechanisms have a key ability to absorb energy through elastic body deformation, and then transfer it to kinetic energy towards its second stable position (Opdahl, P. G., Jensen, B. D., and Howell, L. L., 1998, "An Investigation Into Compliant Bistable Mechanisms," in Proc. 1998 *ASME Design Engineering Technical Conferences*, DETC98/MECH-5914, Anonymous). Studies have been performed on bistable mechanisms with two stable configurations (Jensen, B. D., and Howell, L. L., 2004, "Bistable Configurations of Compliant Mechanisms Modeled Sing Four Links and Translational Joints," Journal of Mechanical Design, University of Michigan, Ann Arbor, Mich., pp. 657-665; Opdahl, P. G., Jensen, B. D., and Howell, L. L., 1998, "An Investigation Into Compliant Bistable Mechanisms," in Proc. 1998 *ASME Design Engineering Technical Conferences*, DETC98/MECH-5914, Anonymous; Masters, N. D., and Howell, L. L., 2003, "A Self-Retracting Fully-Compliant Bistable Micromechanism," J. MEMS, 12, pp. 273-280). Examples of bistable mechanisms include light switches, self-closing gates, cabinet hinges, three ring binders, etc. Bistable compliant mechanisms have an ability to absorb energy through elastic body deformation, and then transfer the energy to kinetic energy applied towards its second stable position. Thus, springs and other external mechanisms are not necessary for energy storage.

Using the pseudo-rigid-body model, the potential energy equation for a compliant mechanism is found. For a small-length flexural pivot or a fixed-pinned segment, the potential energy V stored in the segment is $V=\frac{1}{2}K\Theta^2$, where V is the potential energy, K is the torsional spring constant, and Θ is the pseudo-rigid-body angle. The torsional spring constant is found using the pseudo-rigid-body model.

Using the four-bar mechanism, all active forces must equal zero if a system is in equilibrium, i.e., due to conservation of energy; the total net virtual work on a system is zero (Paul, B., 1979, Kinematics and Dynamics of Planar Machinery, Prentice Hall, Upper Saddle River, N.J.). The principle of Virtual work can be used to find the values of reaction forces or moments caused by a given displacement (Howell, L. L., and Midha, A., 1994, "The Development of Force-Deflection Relationships for Compliant Mechanisms," *Machine Elements and Machine Dynamics*, DE-Vol. 71, 23rd ASME Biennial Mechanisms Conference, Anonymous pp. 501-508). The total virtual work of a system can be expressed as $\delta W = A\delta\theta_2 + B\delta\theta_3 + C\delta\theta_4 = 0$, where $A=(-X_2a_2-Y_2b_2-r_2X_3)\sin\theta_2+(-X_2b_2+Y_2a_2+r_2Y_3)\cos\theta_2+M_2+T_1+T_2$, $B=(-X_3a_3-Y_3b_3)\sin\theta_3+(-X_3b_3+Y_3a_3)\cos\theta_3+M_3-T_2-T_3$, and $C=(-X_4a_4-Y_4b_4)\sin\theta_4+(-X_4b_4+Y_4a_4)\cos\theta_4+M_4+T_3+T_4$. $X_i$ and $Y_i$ are the forces acting in the x and y direction, respectively. $M_i$ is the moment acting on the coupler links and $T_i$ is the potential energy of each joint.

Example 1

Applying these design rules, a square unit cell is chosen, and an application allows each of the four sides and four corners to be able to expand and contract. The minimum number of side members for which this can be achieved is eight (8). Each side of the square unit cell is associated with two side members, and each corner is associated with two side members. The two-thirds rule is used to select the length of the side member and the angle of the member attached at the node, as depicted in FIG. 4.

Figure 6A:
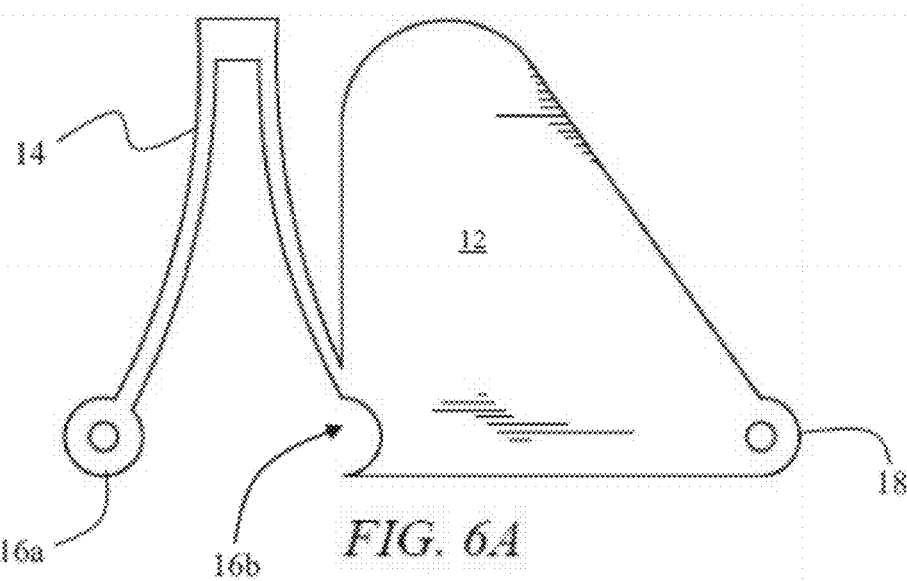
FIG. 6A depicts one of eight identical compliant links that makes a square unit cell.

A compliant mechanism, depicted in FIG. 6A, also referred to as a side member, includes a compliant flexure 14 and a shield or plate segment 12 that functions as a link and slider.

It can be seen that the rigid area-covering portion (i.e., plate segment) 12 constitutes two-thirds of the entire length of the side member. A one-third movement is possible in compression and expansion before gaps form. In addition, the angle at the node is two-thirds of a right angle. This allows a one-third movement in either rotational direction.

Figure 6B:
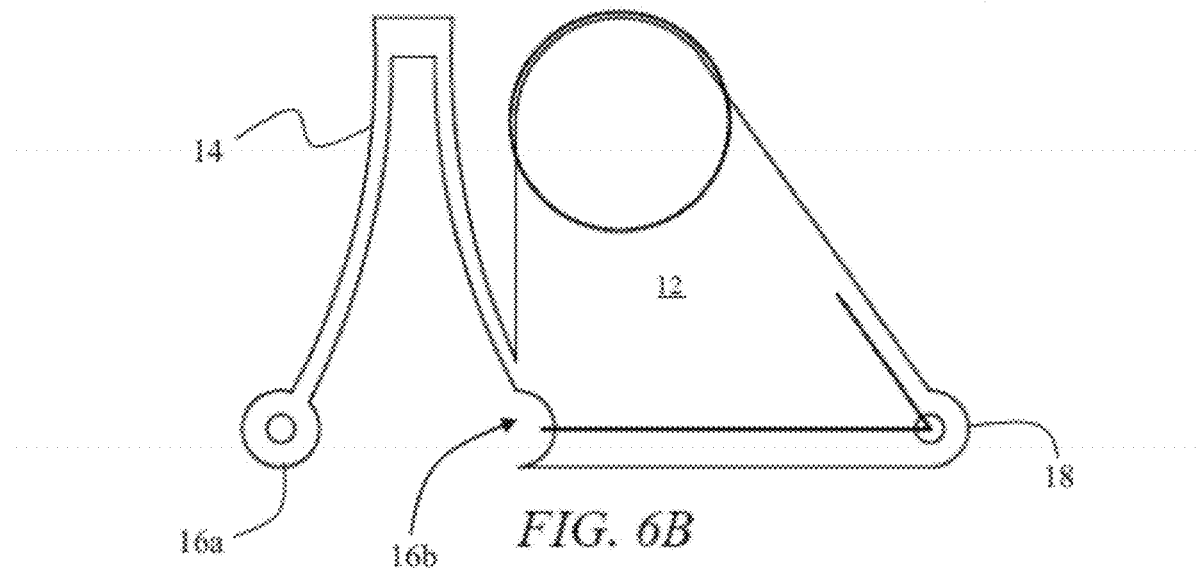
FIG. 6B depicts the compliant link of FIG. 6A but emphasizes its rounded corner.
Figure 6C:
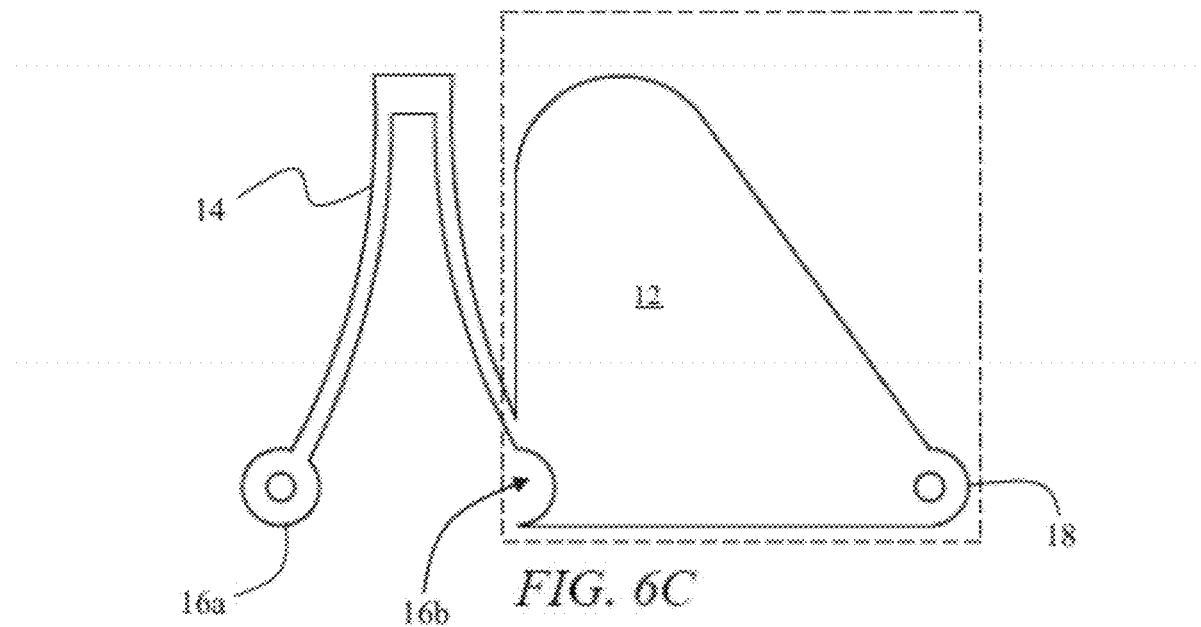
FIG. 6C depicts the compliant link of FIGS. 6A and 6B but emphasizes the part thereof that provides solid interior coverage without gaps or protrusions.

The rounded top, circled in FIG. 6B, of the side member closes the shape and is an interpolation that provides coverage on the inside of the square and some aesthetic appeal, i.e., a rounded corner instead of a sharp one. The portion of the side member designed to provide solid interior coverage without gaps or protrusions is surrounded by a box in FIG. 6C with dashed lines.

The remaining portion of the multistable shape-shifting surface, i.e., the portion of the side member depicted in FIGS. 6D-F, is a compliant mechanism or compliant flexure 14. Its design guides the nodes 16a on a straight-line path when said nodes are in motion. The movable pin 16a can follow a straight path of compression into circular pin slot, as depicted in FIGS. 6D-F. The size of the pin slot 16b substantially matches the size of the movable pin 16a to allow smooth, non-extruding edges in the four-bar's compressed position.

The black arrows in FIG. 6D indicate the direction of principal stiffness for the members of the compliant mechanism 14 capable of bending, i.e., the directions in which motion requires the largest applied force. The arrows in FIG. 6E depict the directions of principal compliance for the bending members, i.e., the directions for which motion requires the least force. The net effect is motion of the node 16a that stays substantially on the straight line connecting the original positions of the nodes as, depicted in FIG. 6F.

There are a number of compliant mechanisms which can achieve the desired straight line motion. These can be designed using rigid-body replacement methodology. The fundamental principles include rigid-body mechanism techniques for straight-line mechanism design and rigid-body replacement methods to eliminate the need for joints and to give the mechanism stiffness or resistance to motion. The use of compliant members in the shape-shifting surface design allows for motion with fewer parts and it provides a default or in repose shape to which the shape-shifting surface tends to return when external forces are removed.

Example 2

Figure 7C:
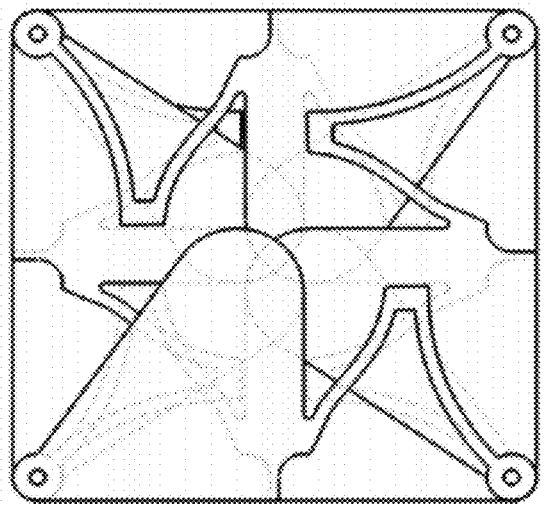
FIG. 7C depicts the unit cell in tension.
Figure 7D:
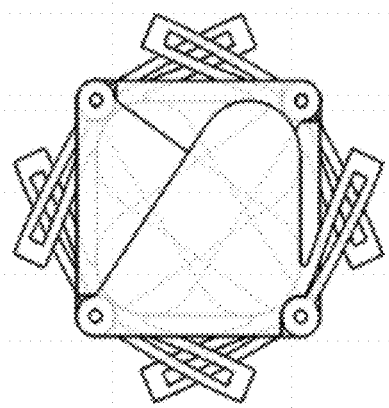
FIG. 7D depicts the unit cell in compression.

Eight side-members are assembled to form the deformable square unit cell depicted in FIG. 7A. FIG. 7B shows the unit cell in a stable sheared position. FIG. 7C shows the unit cell in a stable expanded (or tensed) position. FIG. 7D shows the unit cell a stable compressed position. The amount of deflection that the compliant mechanism can achieve is dependent on the mechanism's geometry and the material properties.

Depending upon the application, adjacent unit cells are designed to limit motion by sharing nodes, or to increase mobility by having separate sets of nodes that may translate with respect to each other. By leveraging the side members, the side members can be stabilized in one position, then sheared, expanded or compressed, and stabilized in the second position.

Example 3

Figure 8A:
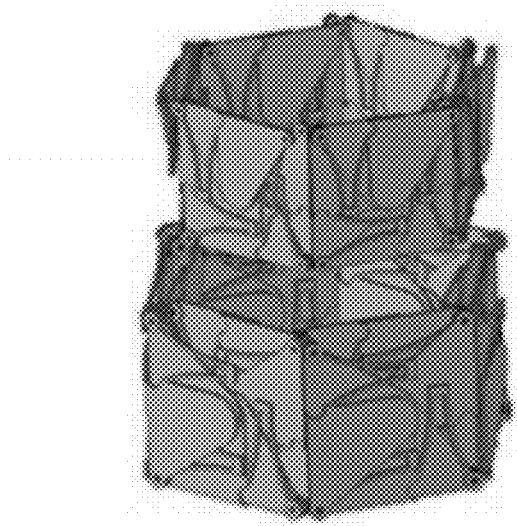
FIG. 8A depicts two rings of different size made from shape-shifting surface squares.
Figure 8B:
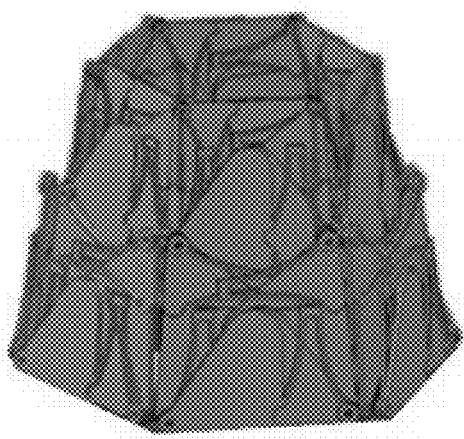
FIG. 8B depicts how the rings of FIG. 8A approximate a cone when joined to one another.

Large-scale geometric effects can be achieved by attaching dissimilar unit cells to each other in ways that put a first cell in tension (i.e., expansion) and a contiguous second cell in compression. For example, a conical surface is created by attaching a smaller compliant ring to a larger one as depicted in FIGS. 8A and 8B. The ability to mate unit cells of dissimilar size enables a discrete set of unit cell sizes to provide the adequate geometric flexibility to build a wide variety of surfaces with varying predetermined shapes of stability.

As depicted in FIGS. 8A and 8B, shape changes can be induced by joining unit cells of dissimilar size. Surfaces are developable if they can be formed by bending, but not stretching or compressing any part of a flat sheet. Multistable shape-shifting surfaces with flexible boundaries between unit cells can be assembled to form developable surfaces such as the one depicted in FIGS. 8A and 8B.

It is contemplated that the unit cells may be coupled to form any simple or complex shapes, including, but not limited to, spheres, cuboctohedrons, truncated icosahedrons with planar or spherical faces, among others.

Example 4

Figure 9B:
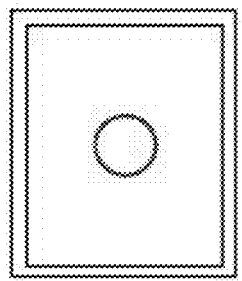
FIG. 9B is a top plan view of a unit cell pair that produces a spherical curvature when tiled.
Figure 9C:
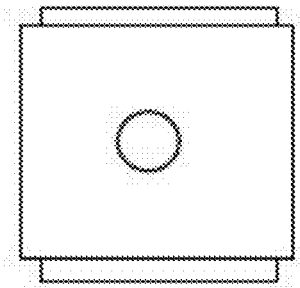
FIG. 9C is a top plan view of a unit cell pair that produces hyperbolic curvature.
Figure 9A:
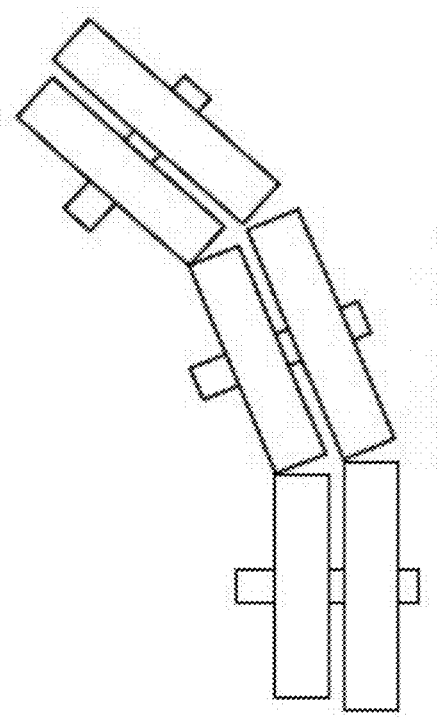
FIG. 9A is a side elevation view of unit cells arranged to produce an intrinsically curved shape-shifting surface via double layers of dissimilar size.

The novel multistable shape-shifting surfaces may have intrinsic curvature such as spheres and use elements produced using planar fabrication techniques. Double layers of shape-shifting surfaces unit-cells of dissimilar size as depicted in FIG. 9A are used in this example. The larger unit cells are attached to each other at the corners, as are the smaller unit cells. The larger unit cells are attached to the smaller unit cells at their centers. The joints between adjacent unit cells are compliant flexures capable of accommodating the different deformations required in each layer. The center of curvature in double-layered shape-shifting surfaces is on the side of the smaller unit cell. FIG. 9B is a top view of a pair of unit cells that, when tiled, produce intrinsic spherical curvature. FIG. 9C depicts a pair of unit cells that produce intrinsic hyperbolic curvature when tiled.

Example 5

Figures 10A, 10B:
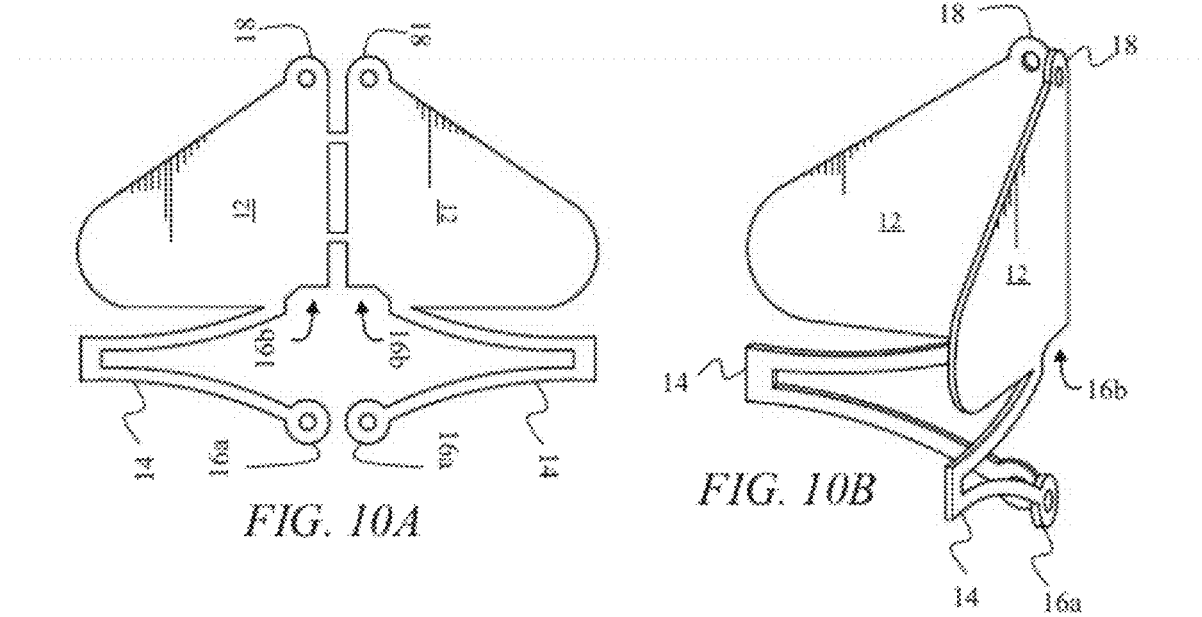
FIG. 10A depicts one of eight sets of compliant links that bend to make a cube.
FIG. 10B depicts a compliant link bent at a 90-degree angle to allow assembly of the cube.
Figure 10C:
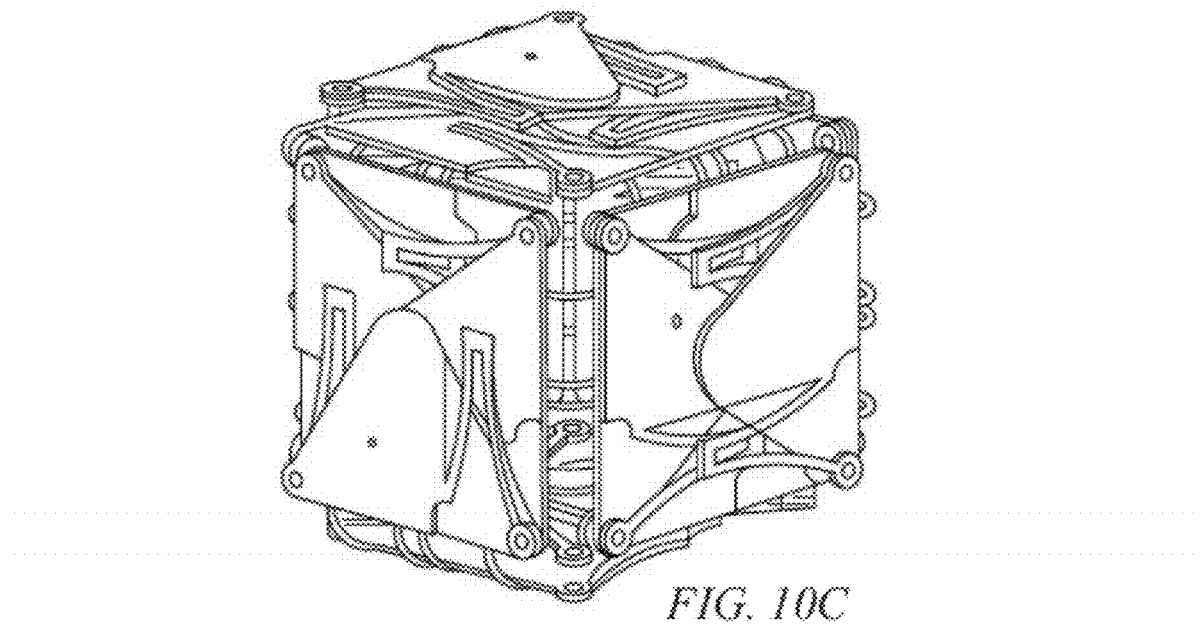
FIG. 10C depicts all twenty four (24) compliant links consisting of eight (8) different sets of three (3) identical links forming together to make a compliant cube.

FIGS. 8A-B and 9A-C illustrate examples of shapes that are attainable by adding unit cells together. FIG. 10A depicts these planar faces connected together, allowing flexibility between adjacent faces. This "double wing" compliant link makes up the square unit cells that are joined together. The two compliant links connecting the shield portions 12 allow the two "wings" to bend at a ninety degree (90°) angle to one another, allowing the formation of a cube. FIG. 10B depicts how this compliant link is bent prior to assembly. These two compliant links provide a torsional resistance as the angle between the two adjacent faces changes when the cube is sheared. A solid model of the cube obtained by joining these individual cells together is depicted in FIG. 10C.

In this cube, there are eight (8) different sets of three identical compliant links or side members made to form the cube. Set one, depicted in FIG. 10A, has the smallest distance between each wing. As each set increases from one to eight (1-8), the link distance between the wings increases linearly with respect to material thickness to allow for correct plane alignment. Each face of the individual unit cell (e.g., FIGS. 7A-D) contains eight (8) layers. Accordingly, there are eight (8) sets of these new links, as depicted in FIGS. 10A-C, to allow for eight (8) overlapping planes.

Figures 11A, 11B:
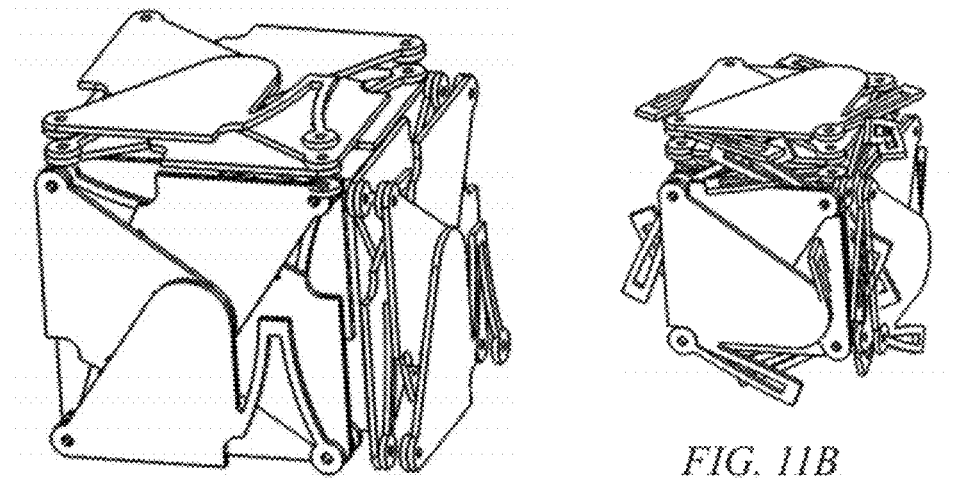
FIG. 11A depicts an unstressed cube.
FIG. 11B depicts the cube of FIG. 12A in compression.
Figures 11C, 11D:
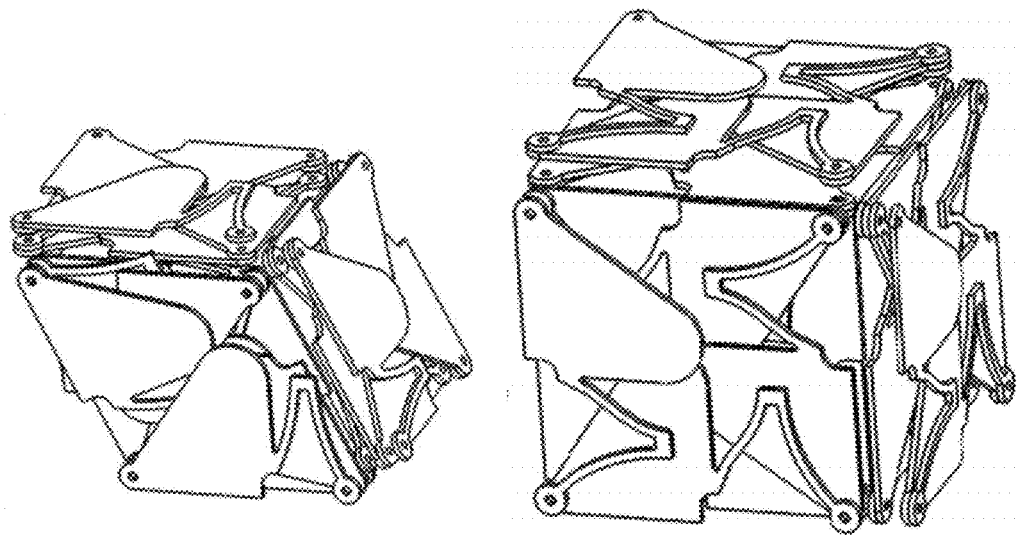
FIG. 11C depicts the cube of FIG. 12A in shear.
FIG. 11D depicts the tube of FIG. 12A in tension (expansion)

FIGS. 11A-D depict the different configurations of the cube showing a stable unstressed position (FIG. 11A), a stable compressed position (FIG. 11B), a stable sheared position (FIG. 11C), and a stable expanded position (FIG. 11D). In FIG. 11A, the cube is unstressed. In FIG. 11B, the cube is compressed with elastic bands leveraged to prevent return to the unstressed position of FIG. 11A. There is a noticeable difference in size between the cube in its unstressed and compressed configurations as indicated in FIGS. 11A and 11B. In FIG. 11C, the elastic bands are used to apply shear loads. In FIG. 11D, the cube is in tension. The size difference in FIG. 11D is noticeable as the cube expands due to the tensile loads. Other complex configurations are also possible.

Figure 12:
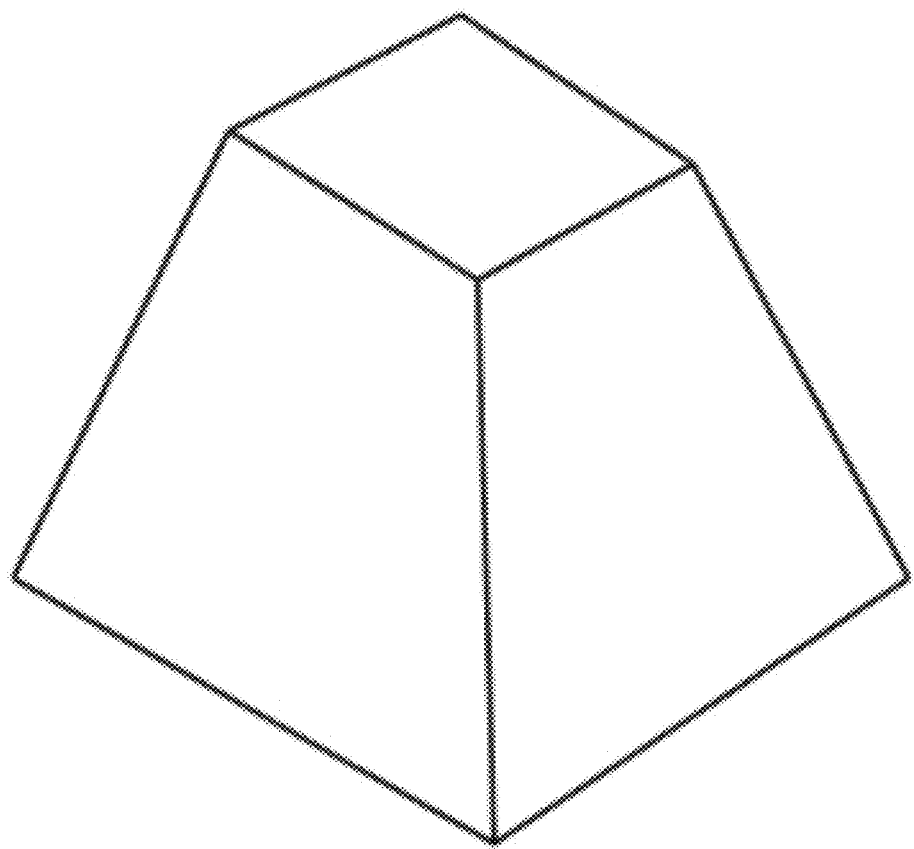
FIG. 12 depicts a cube with compressive forces at the top and tensile forces at the bottom that is deformed into a trapezoidal prism.
Figure 19A:
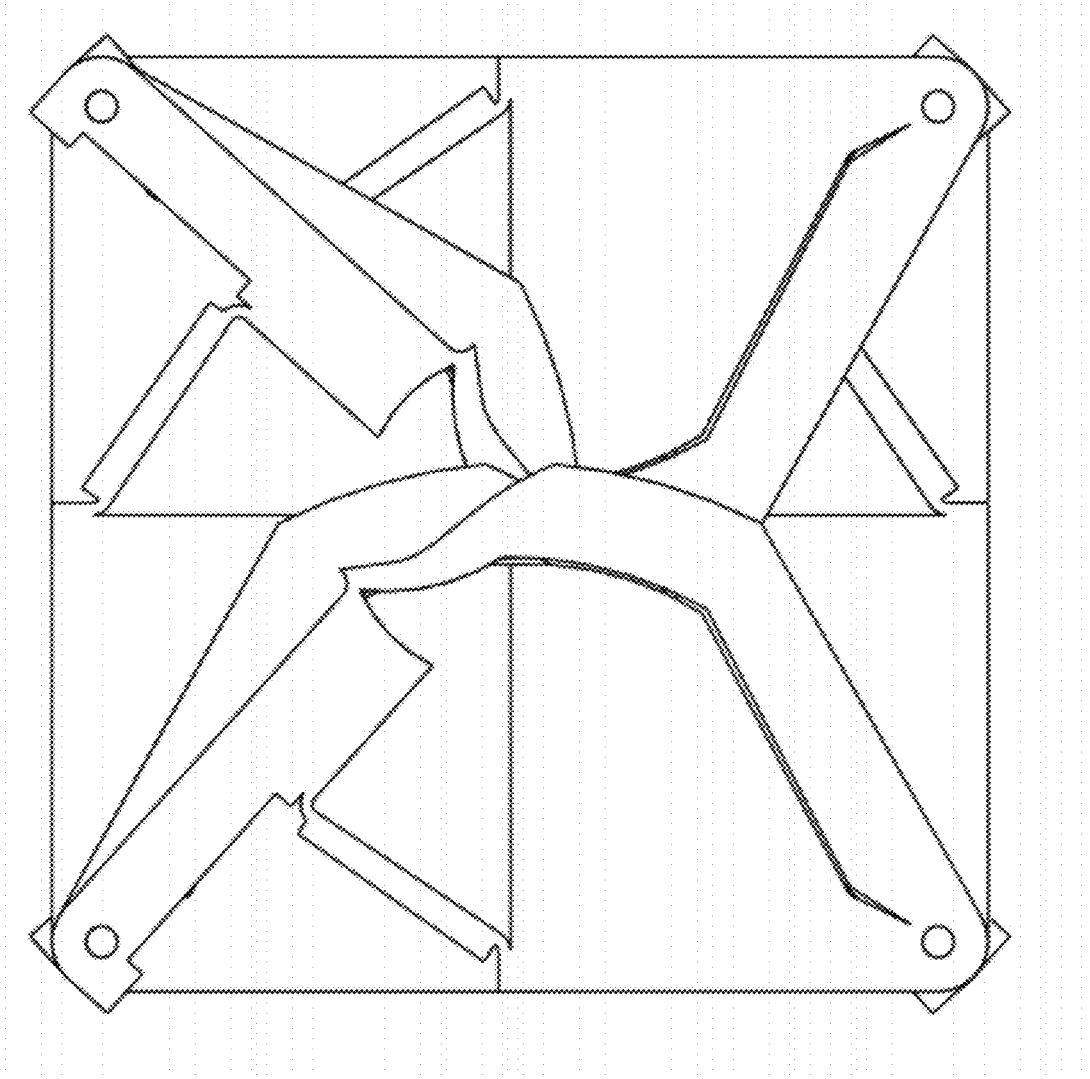
FIG. 19A depicts an unstressed unit cell comprising a plurality of links of FIG. 18.
Figure 19B:
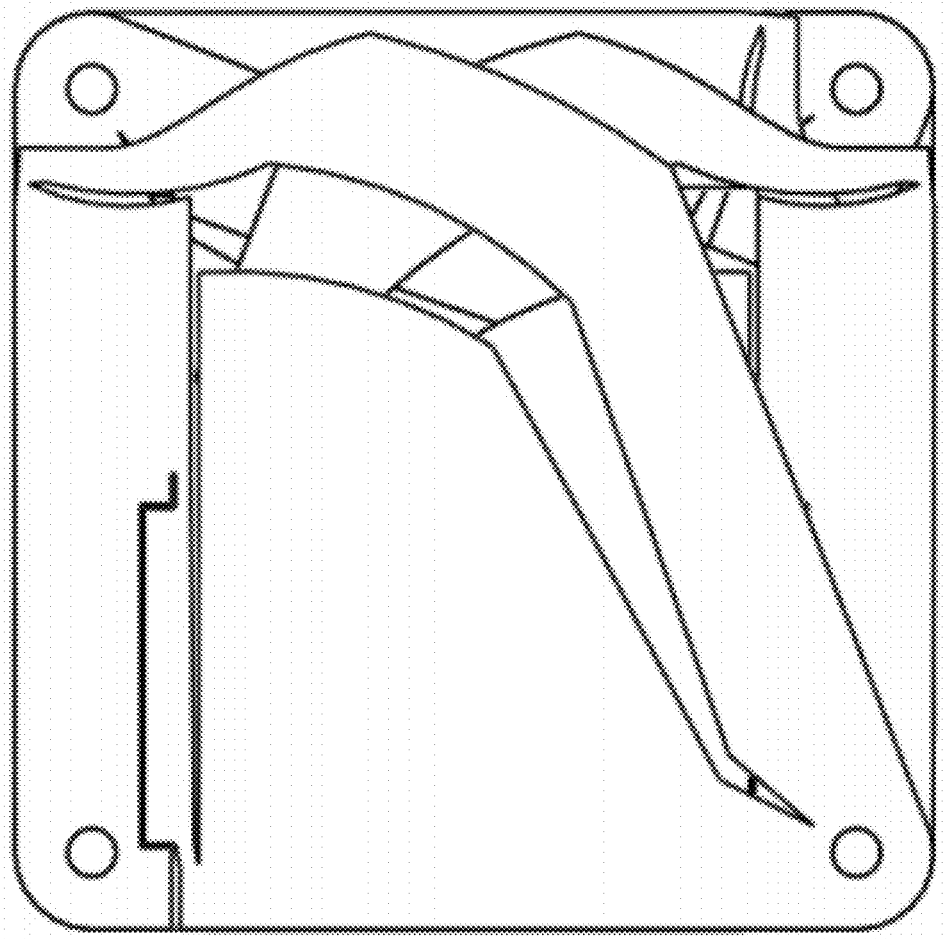
FIG. 19B depicts a compressed unit cell comprising a plurality of links of FIG. 18.
Figure 19C:
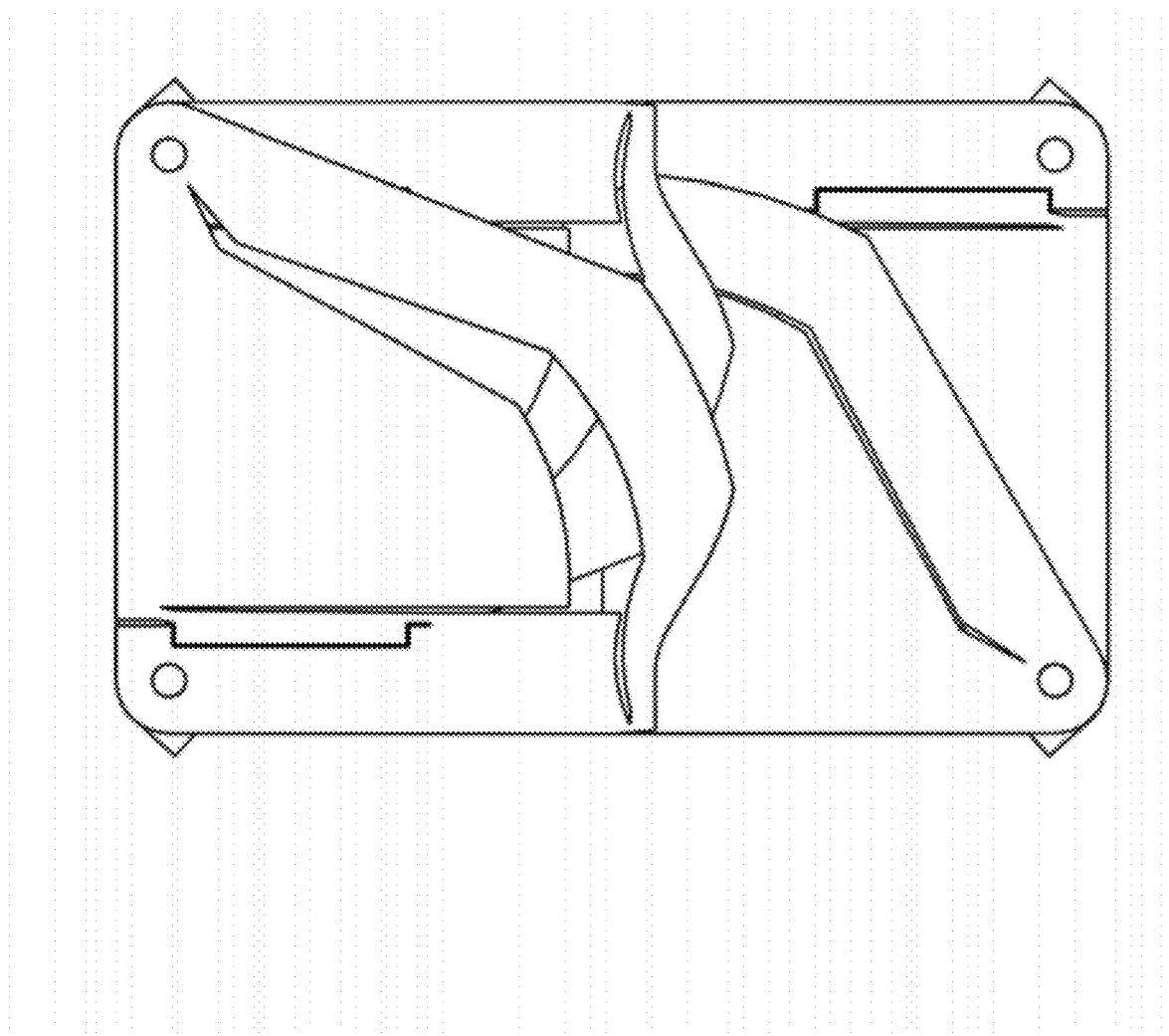
FIG. 19C depicts a unit cell stressed in one direction, the unit cell comprising a plurality of links of FIG. 18.
Figure 19D:
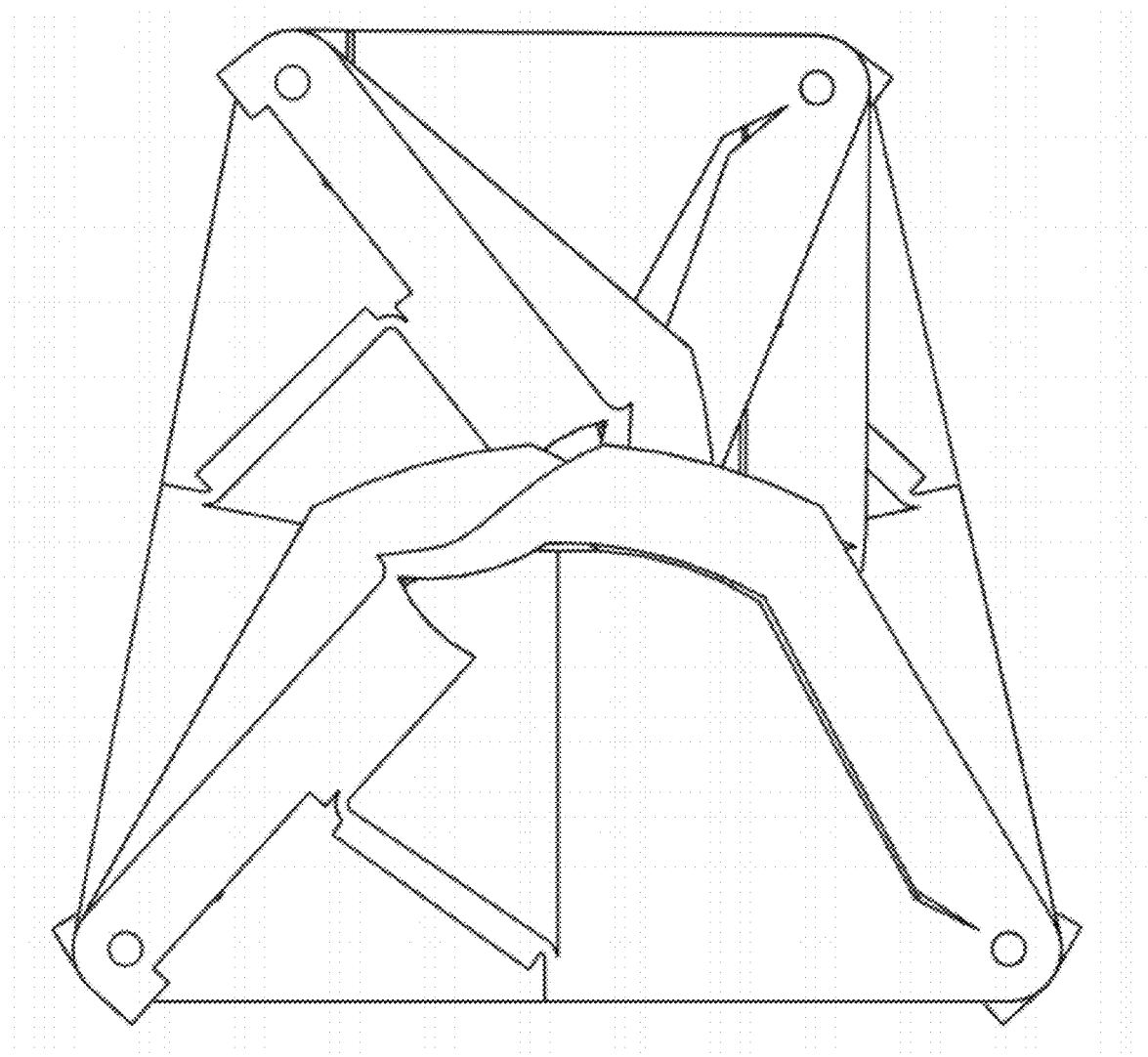
FIG. 19D depicts a unit cell compressed at the top and unstressed at the bottom, the unit cell comprising a plurality of links of FIG. 18.

In FIG. 12, the cube has side members in a stable compressed state at the top and side members in a stabled expanded state at the bottom, resulting in a stable trapezoidal prism shape, similar to that also seen in FIG. 19D. Using these compliant links, depicted in FIGS. 10A-C, to connect the unit cells provides feasible methods of fabricating a wide variety of complex shapes, such as the polyhedral shape depicted in FIG. 1.

Example 6

Figure 14A:
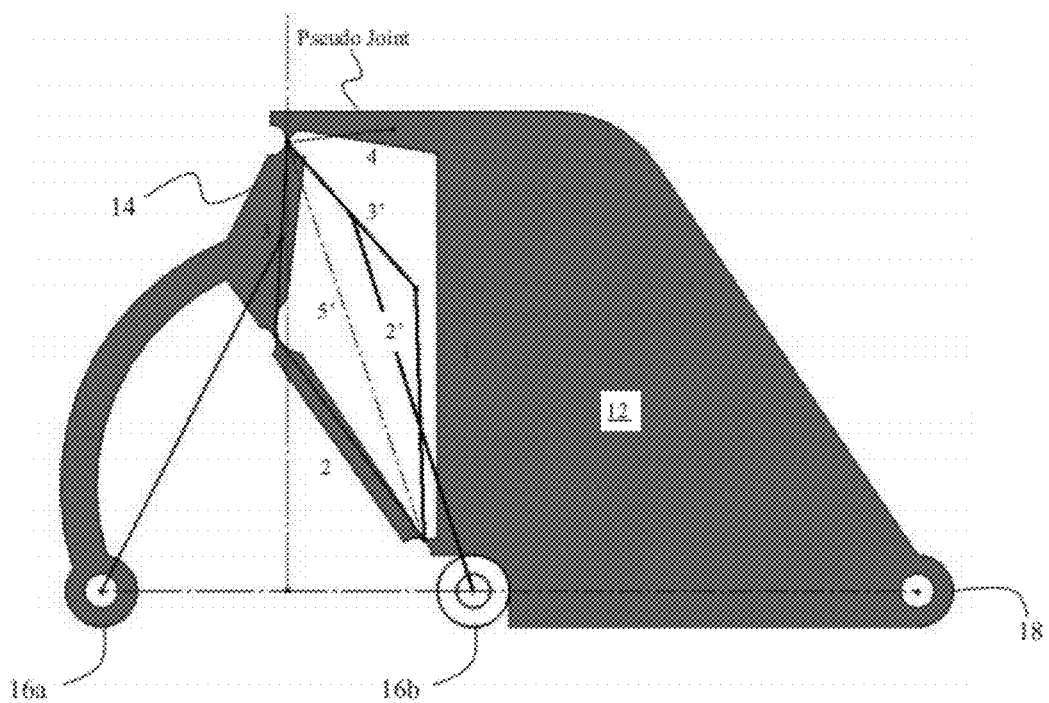
FIG. 14A depicts a motion prediction of a bistable shape-shifting surface link.
Figure 14B:
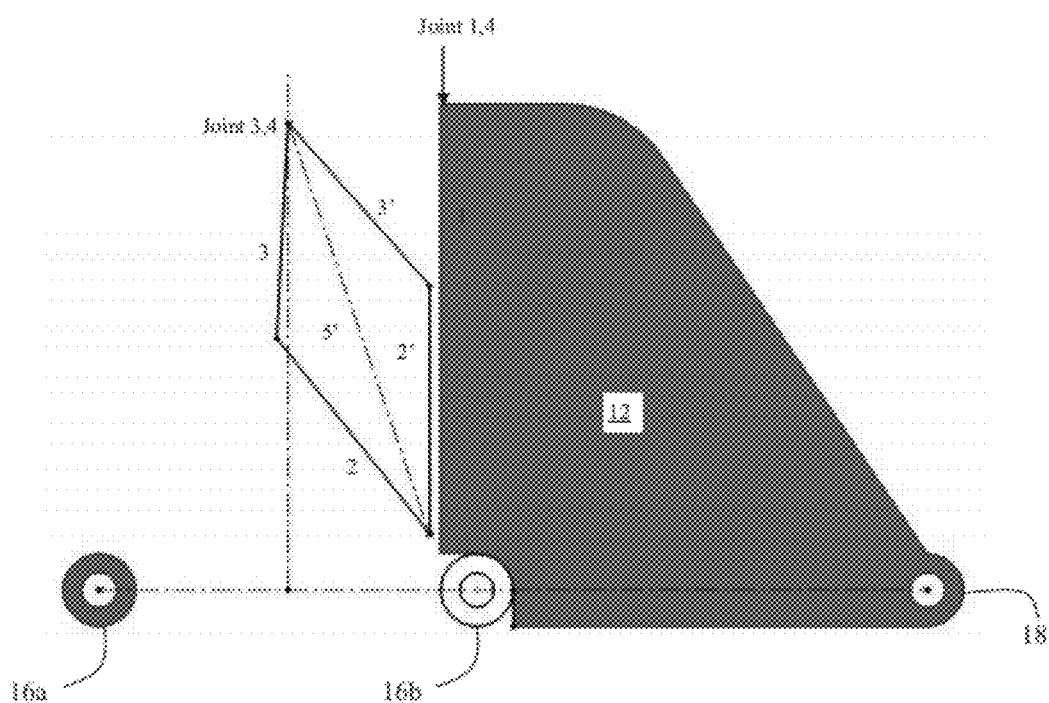
FIG. 14B depicts a connection of fixed joints in a bistable shape-shifting surface link.
Figure 14C:
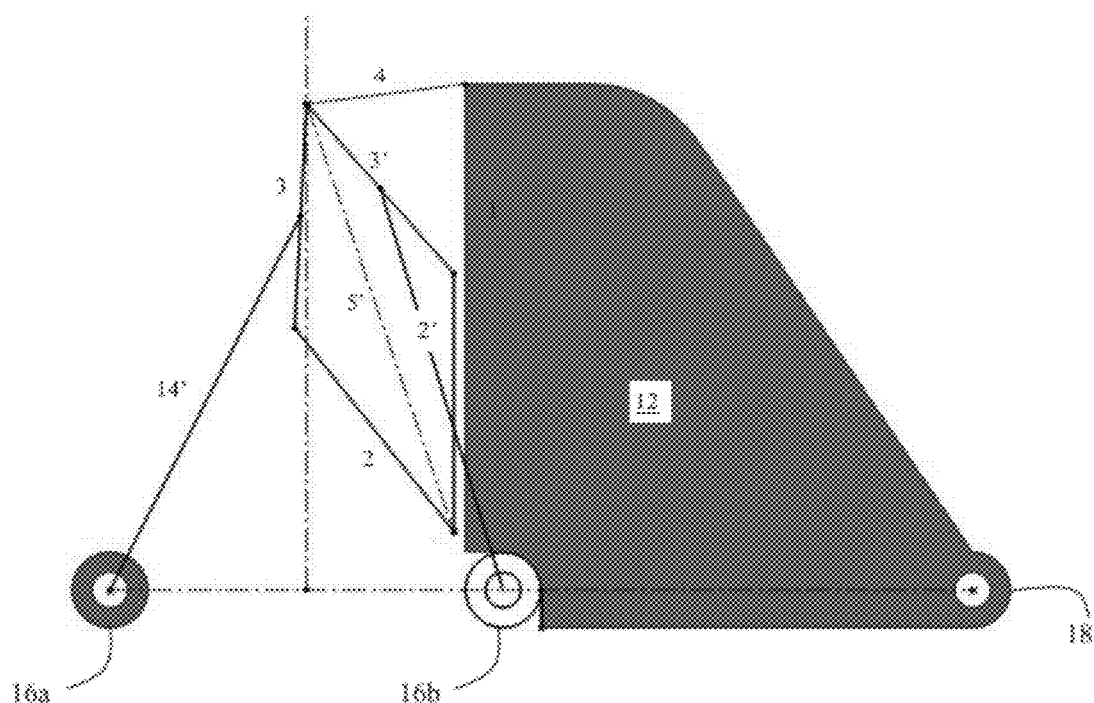
FIG. 14C depicts a motion prediction of a bistable shape-shifting surface link by connecting coupler links to initial and final positions.

As depicted in FIG. 13A, bistable mechanisms tend to show symmetry about their unstable equilibrium position, hence why the two stable positions (i.e., initial position and final position), shown in FIGS. 14A and 14C, are mirrored about this broken line 5. The unstable equilibrium position is found by line 5' that connects the two stationary joints 1,2 and 3,4, or when links 2 and 3 are collinear. In this position, the links 2,3 store high compressive forces within their members and release this energy as the mechanism moves through its unstable equilibrium position to its second stable equilibrium position. To achieve this, link 2 can be rigid enough to oppose the separation of joints 1,2 and 3,4 so that the links 2 and 3 can "pop" through to its second symmetric position.

As links 2 and 3 pass through this unstable position, the movable pin 16a can follow a straight or slightly curved path from its initial position on the left to the final position on the right abutting the plate. The origin is shown in FIGS. 14A-B at the movable pin 16a. The x-axis represents the line of action of the bistable shape shifting surface. The curvature of link 4 may be formed such that when compressed, it would not interfere with links 2 and 3. The degree of curvature of link 4 depends on the amount of extrusion of links 2 and 3 as well as the initial and final positions. The initial position limits the curvature to a minimum, as a large radius of curvature in link 4 will extrude itself past the initial area coverage when tilled together as a unit cell.

An embodiment of the shape-shifting surface is composed of two portions, a rigid-area covering portion 12 and a compliant portion 14. The end of the rigid portion 12 is considered at the pin slot 16b, as this is the first gap to open when expanded. The reason for this pin slot 16b is so that, when compressed, each additional layer will line up with the outer edge of the rigid portion 12 creating collinear edges. The size of the pin slot 16b is to match the size of the pin 16a of the compliant portion 14. This can be seen in FIGS. 14A-C where the pin 16a of the compliant portion 14 is located at the node, and the pin slot 16b is located at the final position, to where the node of the pin 16a is relocated upon deformation of the unit cell.

To maximize the area of coverage by the rigid portion 12 and displacement (or unit cell deflection) by the compliant portion 14, the linear distance from each pin (rigid portion pin 18 and opposing compliant portion pin) can be divided into halves. Therefore, considering the line of action between pins, the length from the area covering rigid portion pin 18 to the edge of area coverage will equal the length of the compliant portion pin 16a to the edge of the area coverage portion 12. Moreover, to maximize displacement, diameter of the pin 16a may also be minimized and/or size of the rigid portion 12 may be maximized. The limitation of the pin diameter relies on the application and its tear-out and bearing stresses from the applied loads. For example, if a pin diameter is 0.4 inches, deformation of the shape may result in a 0.2 inch offset of displacement to area coverage.

The diameter of the pin 16a was designed with an arbitrary value of 0.4 inches. This permitted more space for the compliant portion design. However, the one-half rule relation was developed assuming the displacement of each pin 16a behaved as a point; thus pin diameter was not accounted for in this relation. Consequently, the displacement of the flexural pin 16a is the length of the shield 12, minus the radius of the pin 16a. Therefore, having a diameter equal to 0.4 inches subtracts 0.2 inches (radius of the pin) from the displacement of the flexural pin 16a.

The deformation or displacement of the entire link 14 should not exceed to the horizontal length of the shield 12, as this could prevent the compliant portion 14 (i.e., movable pin 16a) from displacing past its adjacent layer's shield, thereby opening gaps or extrusions in either direction of movement (expansion or contraction).

order to have the movable pin 16a begin and end on the same line of action so that the adjacent overlapping layers will align with the boundaries when compressed, joint 1,4 is symmetric about the pins' initial and final positions, i.e., joint 1,4 has a constraining position of half-way between the initial compliant portion pin 16a and its final position in the pin slot 16b. FIG. 14A illustrates the perpendicular midpoint line on which joint 1,4 can lie. If joint 1,4 is on this line, excluding the intersection with the line of action, the mechanism's compliant portion pin 16a will begin and end on the intended positions shown. It is preferred however, to have joint 1,4 farther away from the line of action. This is so that the short-length flexural pivot does not rotate through a large angle as would occur if joint 1,4 were closer to the line of action.

The position of joint 2,3 is relatively arbitrary. It simply cannot lie on top of any other joint, and is preferred farther away from joint 1,4. The unit cell is more effective when joint 2,3 is farther away from joint 1,4 due to the smaller angle of rotation of the short-length flexural pivots. If joints 2,3 and 1,4 are close together, the needed angle to rotate through is greater in order to achieve the same length displacement of the movable pin 16a.

Joint 1,4 can be placed at the greatest vertical distance before extruding out of the initial shape shifting surface area coverage. Thus, the angle this joint experiences can be minimized when joints 2,3 and 1,4 are farther away. The greater the vertical distance is, the less of an angle that must be deflected. Joint 2,3 can also be placed on the edge of the area coverage so that it does not interfere with any linkages or movable pins.

Depicted in FIG. 14B, links 2 and 3 are shown as the initial expanded position; links 2' and 3' are shown in the final compressed position. The position of joint 3,4 on the midpoint line was relatively arbitrary, yet was strategically placed farther away from the line of action. Joint 1,2 was also arbitrary, but yet was strategically placed closer to the edge of area coverage so it was out of the way and farther away from joint 3,4. The angle between links 3 and 3' and links 2 and 2' determine the force of its bistability. The larger the initial angle between links 3 and 3' and links 2 and 2', the farther joint 3,4 has to displace to allow for links 2 and 3 to pass through their collinear stage (unstable equilibrium position) 5'. Since joint 1,4 is modeled as a strong linear torsional spring, link 4 will resist this displacement of joint 3,4 with a force proportional to its deflection. Therefore, since joint 3,4 will experience a larger displacement due to the large angle between links 3 and 3' and links 2 and 2', the reaction force will be greater, thus providing stronger bistability.

Figure 15A:
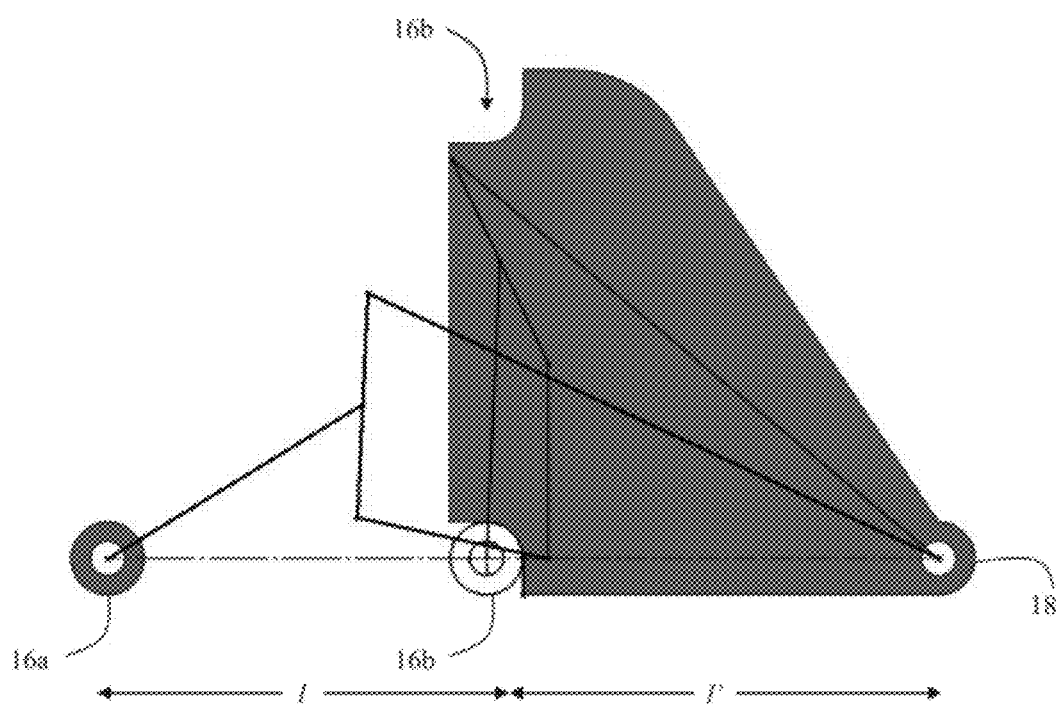
FIG. 15A depicts link lengths and angles within a bistable shape-shifting surface link.
Figure 15B:
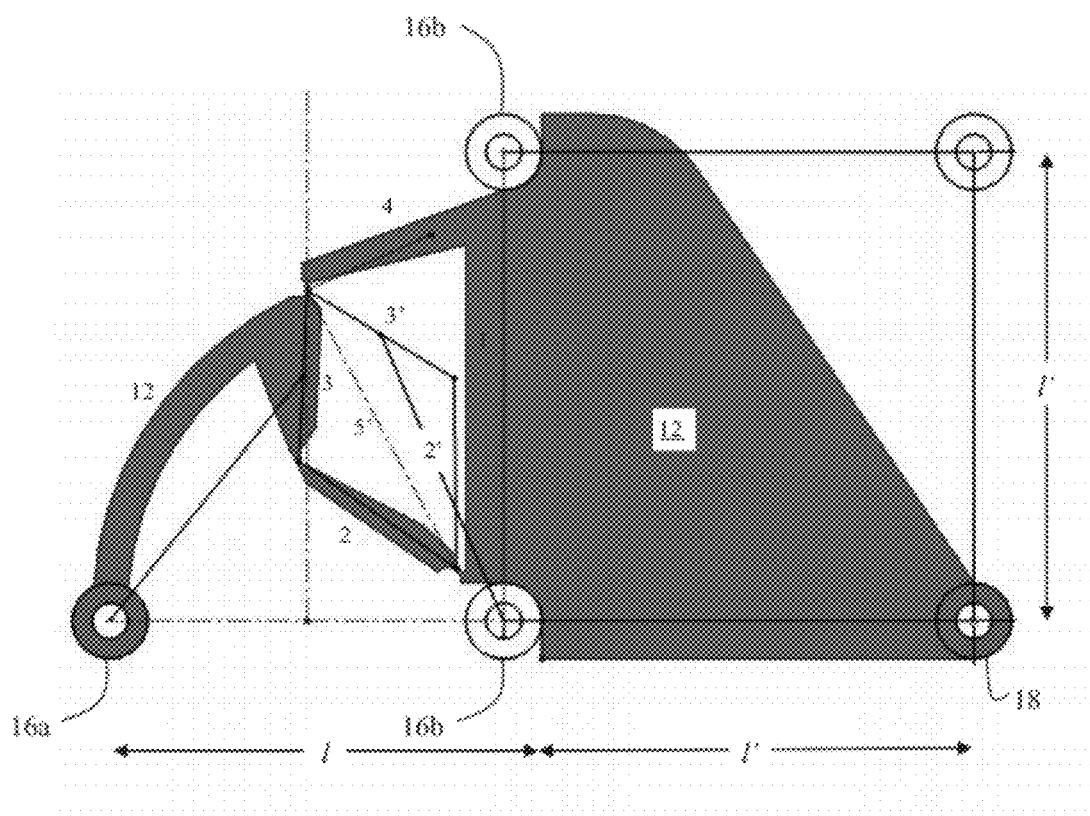
FIG. 15B depicts a motion prediction of a bistable shape-shifting surface link.

The length from the 'edge of area coverage' 16b to the 'flexure pin' 16a cannot exceed the horizontal length of the shield, and is denoted by l, as seen in FIGS. 15A-B. Therefore, link displacement and area are inversely proportional. In order to maximize both displacement and shield area, a simple relation was determined; the lengths of each section (compliant portion 14 and shield 12) were divided into half. Therefore, considering the line of action between pins, the length from the shield pin 18 to the 'edge of area coverage' is equal the length of the flexural pin 16a to the edge of the area coverage 16b. This is shown in FIGS. 15A-B where each length is equal to l.

As depicted in FIG. 14C, a coupler 12' is connected from the midpoint of link 3 to the compliant portion pin in its initial and final positions. Also, joint 3,4 is connected to ground by link 4. Everything to the right of the broken line 5' connecting joint 3,4 and 1,2 is the unit cell's final position. Everything to the left of the broken line is the unit cell's initial position. FIG. 14A shows the initial and final stable positions aligned with the line of action and is the skeletal model used to make the pseudo-rigid-body model of the compliant four-bar mechanism shown in FIG. 14D. The torsional spring is placed on joint 1,4 and resists the transverse movement of joint 3,4 giving the mechanism its bistable behavior. The path of the movable pin 16a follows a near linear trend as it moves from the first stable equilibrium position to its second stable equilibrium position.

Figure 14D:
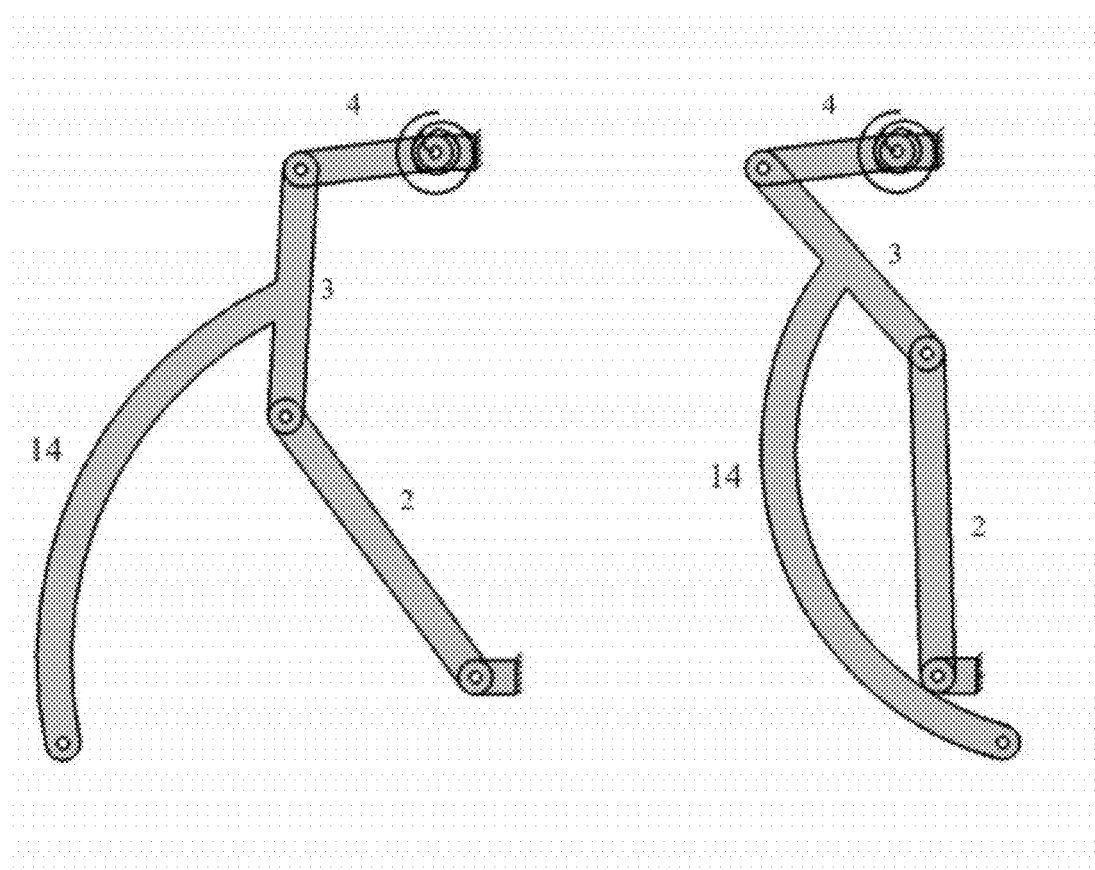
FIG. 14D depicts a pseudo-rigid-body model of a four-bar design in a bistable shape-shifting surface link.

To form FIG. 14D, every joint in FIGS. 14B-14C is replaced with a short-length flexural pivot, except joint 1,4. Joint 1,4 allows the shape shifting surface to be bistable. Joint 1,4 can have a stiff torsional spring in order to force joint 3,4 in its initial position, thereby giving two preferred stable positions for links 2 and 3. Also, the location of joint 1,4 is arbitrary. Therefore, link 4 can be modeled as a fixed-pinned cantilever beam. This allows for relatively high stiffness to oppose movement in joint 3,4. A taper can be added to the cantilever, so its torsional spring constant can be easily manipulated by changing the thickness of its base. This way, joint 3,4 remains unchanged by preventing any change in thickness of link 4, which, in turn, would move the position of joint 3,4.

To layer the shape shifting surfaces, the area coverage of the shape shifting surface must be formed so that the adjacent pins from perpendicular layers do not interfere when compressed to the unit cells smallest (compressed) position. The location of joints can be altered to achieve this goal of allowing sufficient space into which an adjacent pin may fall. This can be seen in FIG. 15B.

Stress can be checked within the compliant links to assure no yielding occurs. Because joints 1,2 and 2,3 and 3,4 in FIGS. 14B-14C are thin, short length flexural pivots, and do not contribute significant torsional resistance, they can be treated as living hinges with negligible stresses. Joint 1,4 can be a stiff joint modeled with a torsional spring, or a cantilever beam that experiences bending stress. Bending stress can be measured in terms of deflection by $$\sigma = \frac{3\delta Ec}{L^2},$$

where E is the modulus of elasticity, c is the distance farthest from the neutral axis, L is the total length of the beam, and δ is tip deflection. The equation assumes a constant thickness beam. If a tapered thickness beam is used, it can be assumed that the entire link's thickness is the thickness of the tapered base to give a worst case scenario of stress since deflection is prescribed, i.e., stress is proportional to link thickness when considering a given deflection.

Various materials can be used to develop these multistable shape shifting surfaces. Materials with high percent elongation, such as polypropylene, will show lesser signs of stress or fatigue within its members. The materials should be able to handle higher stresses without experiencing significant or noticeable permanent deformation.

When sufficient external force has been placed on the unit cell in a first stable position, the unit cell deforms into a second shape and may stabilize, as discussed herein.

Example 7

Figure 16A:
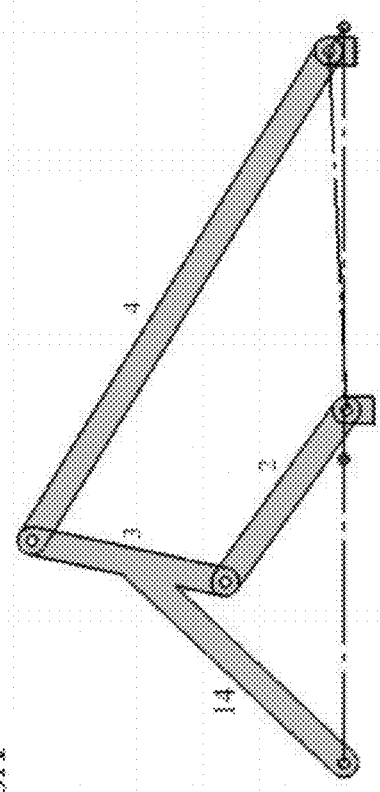
FIG. 16A depicts a pseudo-rigid-body model of a four-bar design in a bistable shape-shifting surface link in an expanded position.
Figure 16B:
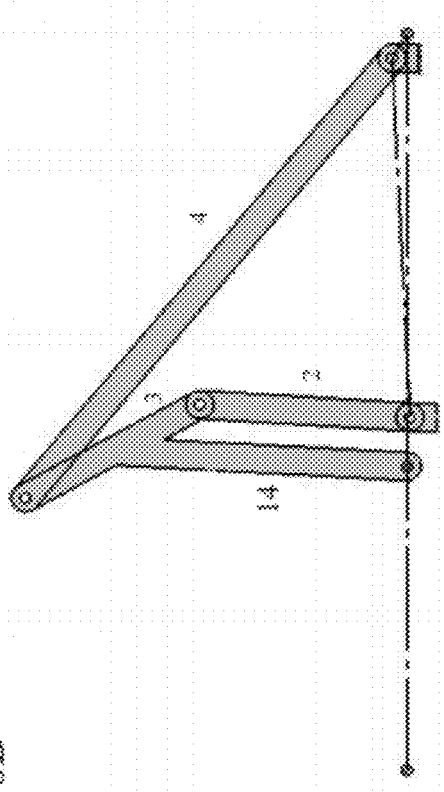
FIG. 16B depicts a pseudo-rigid-body model of a four-bar design in a bistable shape-shifting surface link in a compressed position.
Figure 17:
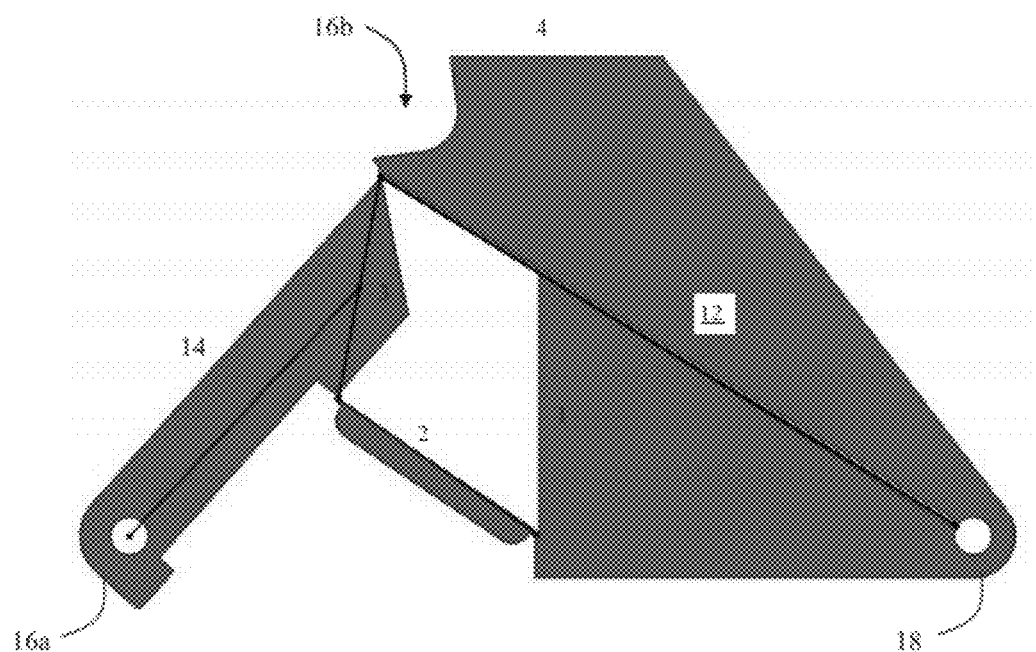
FIG. 17 depicts a compliant multistable shape-shifting surface link.
Figure 18:
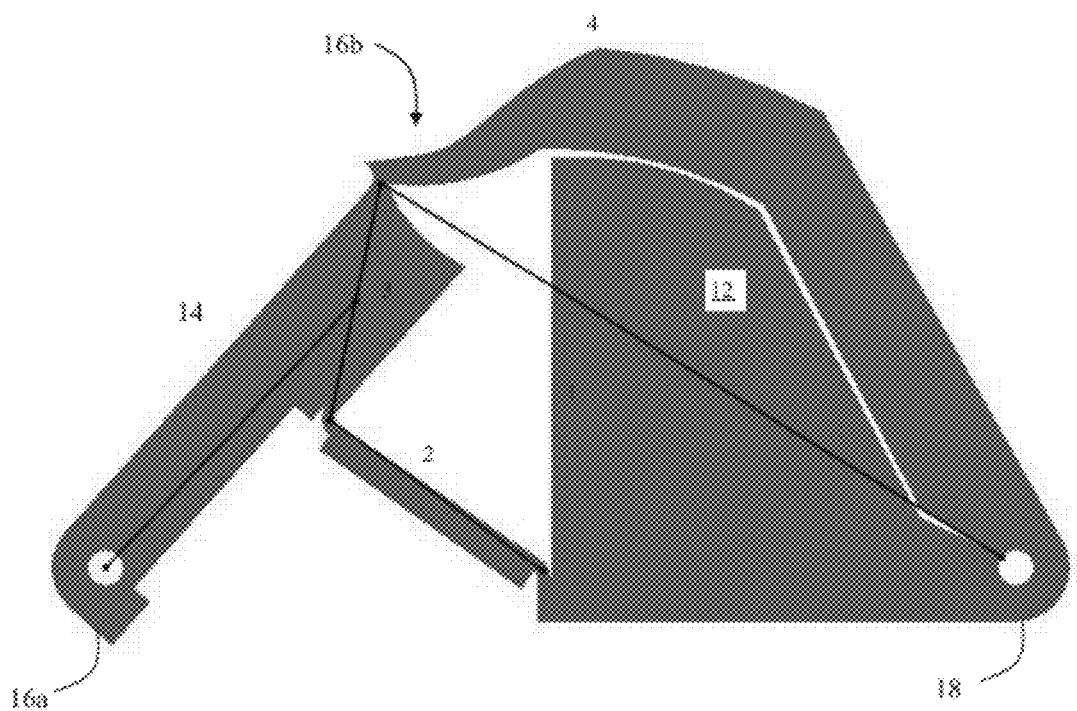
FIG. 18 depicts a compliant multistable shape-shifting surface link.

FIGS. 16A-B depicts a kinematic structure for an embodiment of the current invention that comprises certain side members including compliant sections 14 capable of being stable in more than one equilibrium position. FIG. 16A depicts the kinematic structure in expanded position, and FIG. 16B depicts the kinematic structure in compressed position. FIG. 17 depicts an embodiment of the current invention that comprises certain side members including compliant sections 14 capable of being stable in more than one equilibrium position. FIG. 18 depicts another embodiment of the current invention that comprises certain side members including compliant sections 14 capable of being stable in more than one equilibrium position.

Links 2 and 3 contain compressive forces that force links 2 and 3 into two non-collinear positions symmetric about their collinear stage 5', similar to that seen in FIGS. 13A-C. A unique torsional spring was placed at joint 1,4 to give the link its bistable behavior. Since joint 1,4 lies near the shield plate 12, it uses the pin hole 16b as a joint.

The difference between FIGS. 17 and 18 are the design iterations of link 4. In FIG. 18, link 4 can be created with a curvature that ensures complete area coverage throughout the unit cell's deformations.

Stress on the links can be calculated and determined substantially similar to the method described in Example 6.

FIGS. 19A-D depict a unit cell made up of a plurality of the embodiment of FIG. 18. FIG. 19A depicts the unit cell in an initial, un-deformed (un-deflected), expanded position. FIG. 19B depicts the unit cell in a stable compressed position. FIG. 19C depicts the unit cell in a stable position where the unit cell is deformed in one direction only. FIG. 19D depicts the unit cell in a stable position where the unit cell is compressed at the top and remains expanded at the bottom to form a trapezoidal shape. In this embodiment, there is no linkage overhang, i.e., all linkages remain within the shield plate when the unit cell is compressed.

Example 8

Figure 20A:
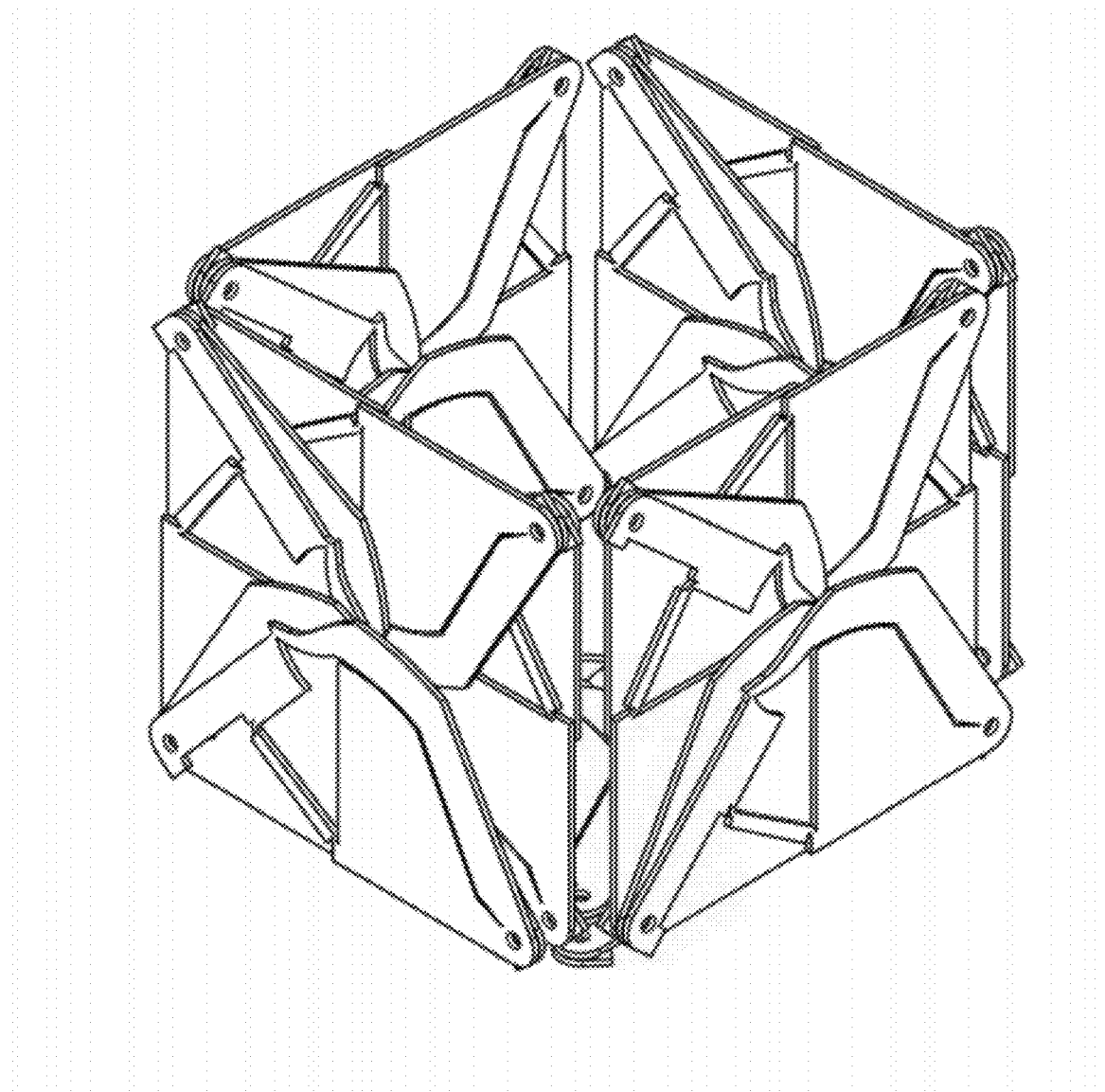
FIG. 20A depicts a plurality of unit cells of FIG. 19A forming an out-of-plane shape.
Figure 20B:
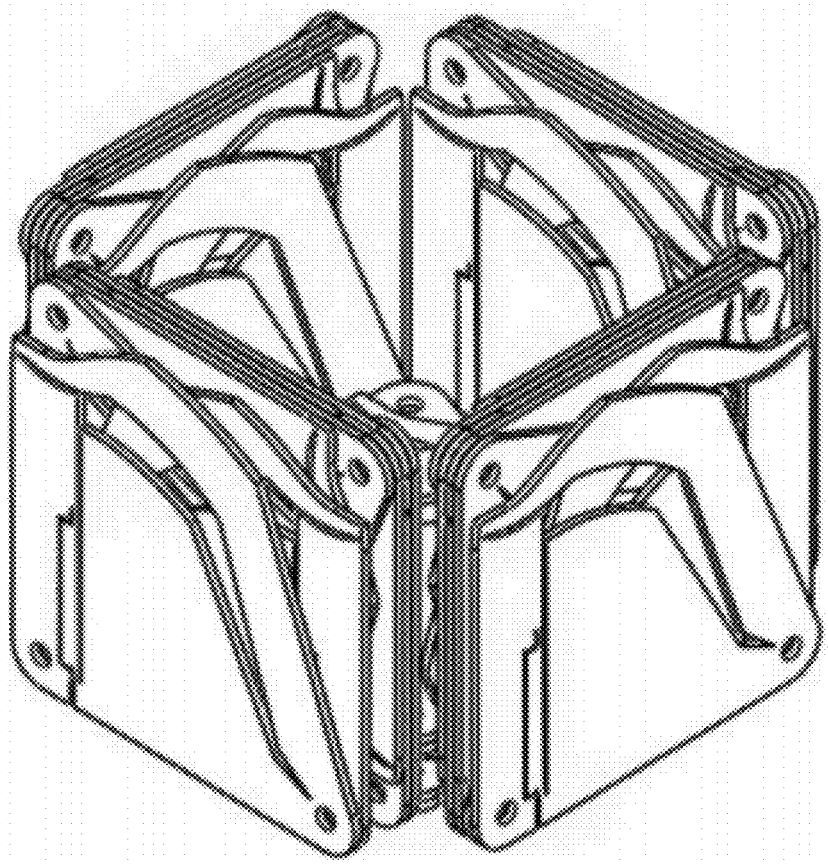
FIG. 20B depicts a plurality of unit cells of FIG. 19B forming an out-of-plane shape.
Figure 21:
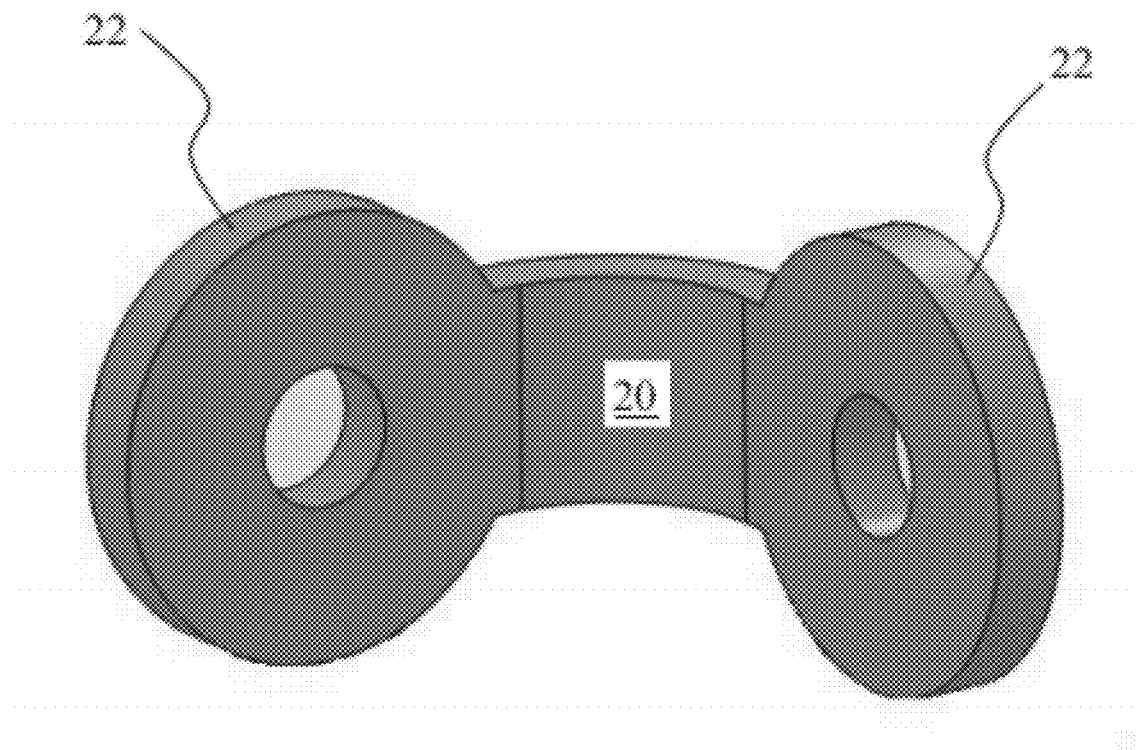
FIG. 21 depicts a compliant pin connector.

A plurality of the multistable unit cells of FIGS. 19A-B can be tilled to develop a variety of out-of-plane shapes, for example as seen in FIGS. 20A-B. Adjacent unit cells can be coupled using any suitable compliant pin connector, for example as seen in FIG. 21. The pin connector has a compliant portion 20 and connector portions 22 on each end. The pin connector should be easily deformable into any angle.

FIG. 20A depicts a square container in an initial, un-deformed, expanded position. FIG. 20B depicts the square container in compressed position. The container also has the ability to shear when not in a compressed position. This example comprises five unit cells forming a base and four sides. However, any number of unit cells can be coupled at any size as desired by a user. A variety of shapes and sizes are envisioned.

Example 9

Figure 22A:
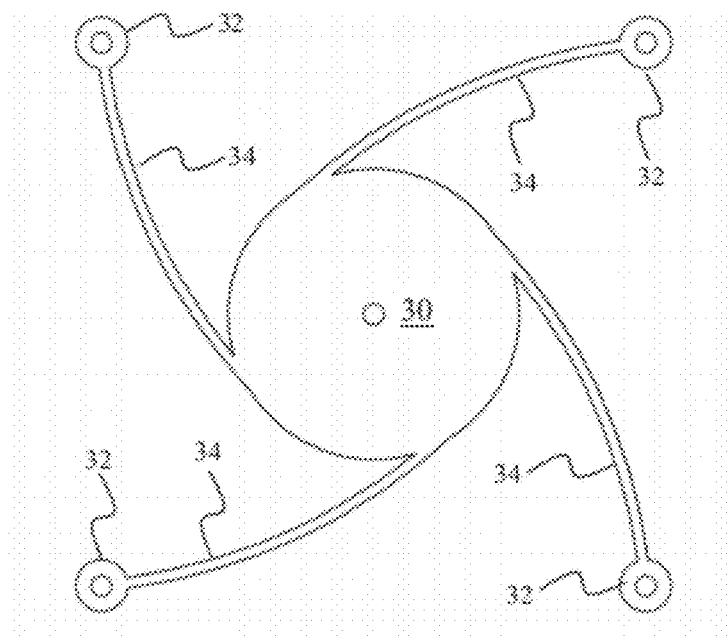
FIG. 22A depicts a compliant multistable shape-shifting surface link.

FIG. 22A depicts an embodiment of the current invention with a center-node 30 and four curved outer nodes 32 extending therefrom. All outer nodes 32 are curved in the same direction (i.e., counterclockwise or clockwise). FIGS. 23A-C depict a unit cell made up of a combination of a plurality (e.g., two) of the embodiment of FIG. 22A and a plurality (e.g., four) of the embodiment of FIG. 22C. FIG. 23A depicts the unit cell in an initial, un-deformed (un-deflected), expanded position. FIG. 19B depicts the unit cell in a stable compressed position. FIG. 19C depicts the unit cell in a stable position where the unit cell is deformed in one direction only. In this embodiment, there is no linkage overhang, i.e., all linkages remain within the shield plate when the unit cell is compressed.

The center-node 30 must be connected to each of the four outer nodes 32 by a kinematic slider 34. It uses a centered, large-radius circle plate that serves as shield coverage, with four initially-curved compliant linkages that connect to the outer four nodes 32 of the unit cell. These linkages serve as kinematic sliders 34 that are capable of rotation as well as lateral motion.

Figure 22B:
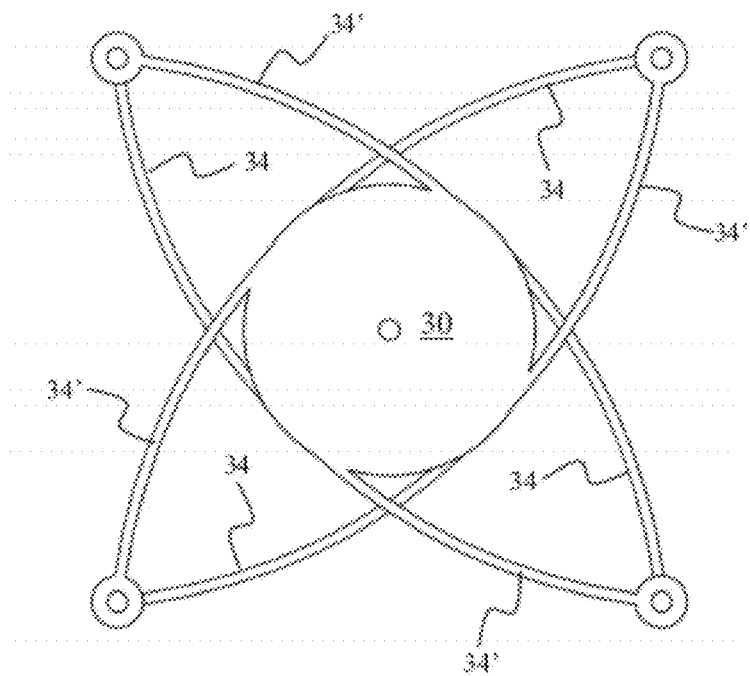
FIG. 22B depicts two compliant multistable shape-shifting surface links connected and configured in opposite directions.

Because all four compliant links on the center-plate are initially curved in the same direction, they will have a tendency to give a biased torsional resistance when compressing or expanding the unit cell. Therefore, two center-plates 32 are used on each side of the unit cell, as depicted in FIG. 22B, each being in opposite direction in order to cancel any biased torsional resistance. Because each center plate 32 faces in opposite directions, kinematic sliders 34' curve in the opposite direction, so the nodes of each overlap. The embodiments of FIG. 22C are sandwiched between the two center-plates in the unit cell.

Figure 22C:
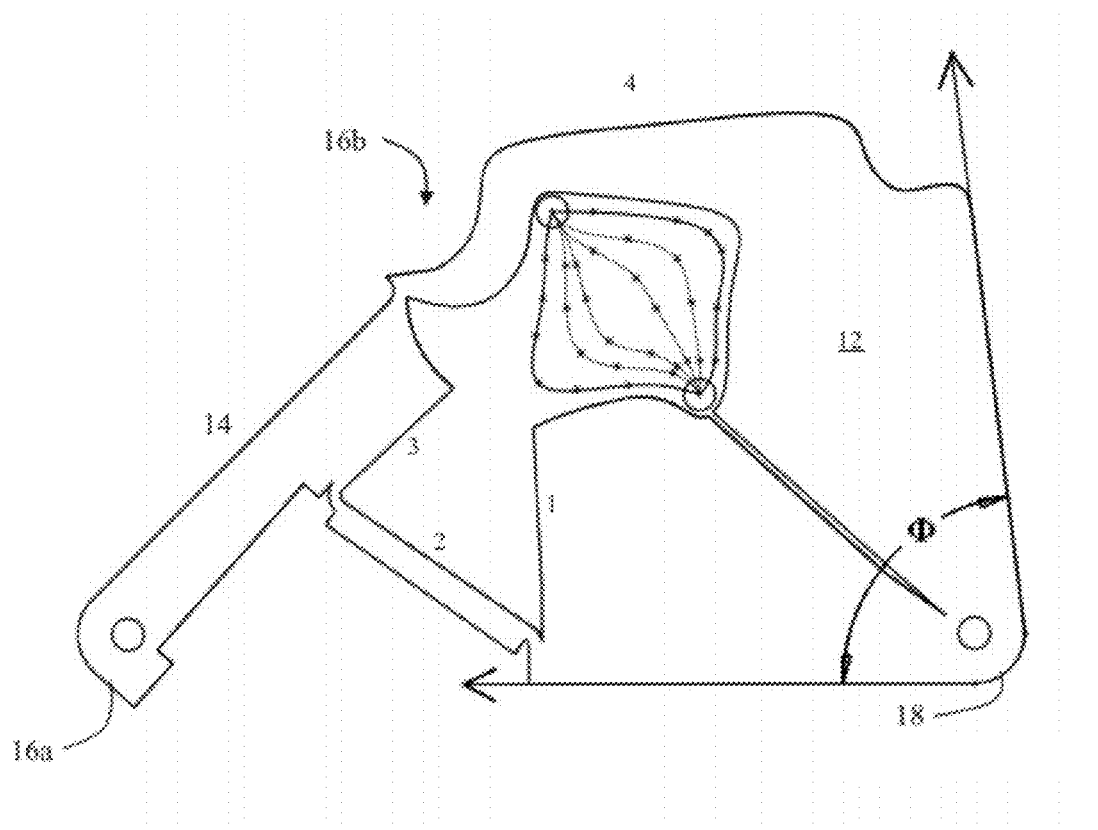
FIG. 22C depicts a compliant multistable shape-shifting surface link, used as a plurality or in combination with the embodiments of FIG. 22A or 22B.
Figure 23A:
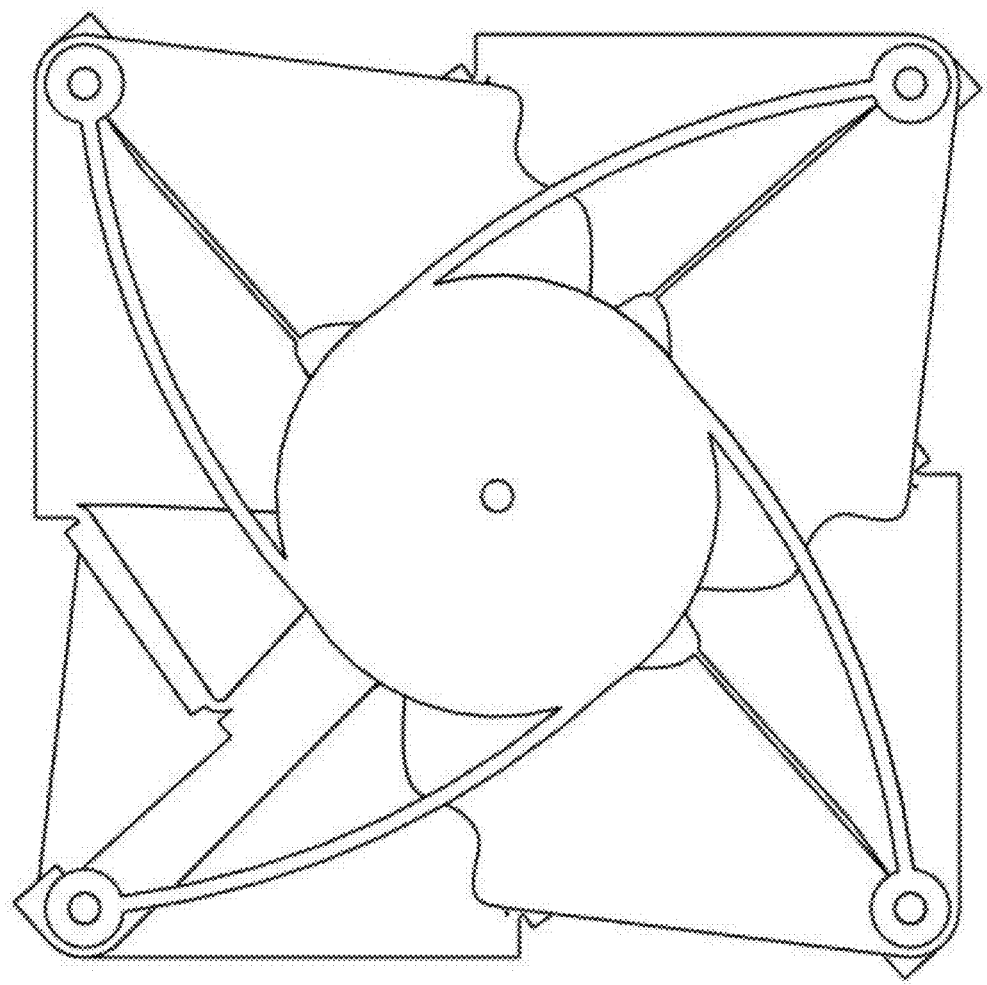
FIG. 23A depicts an unstressed unit cell comprising a plurality of links of FIGS. 22A and 22C.
Figure 23B:
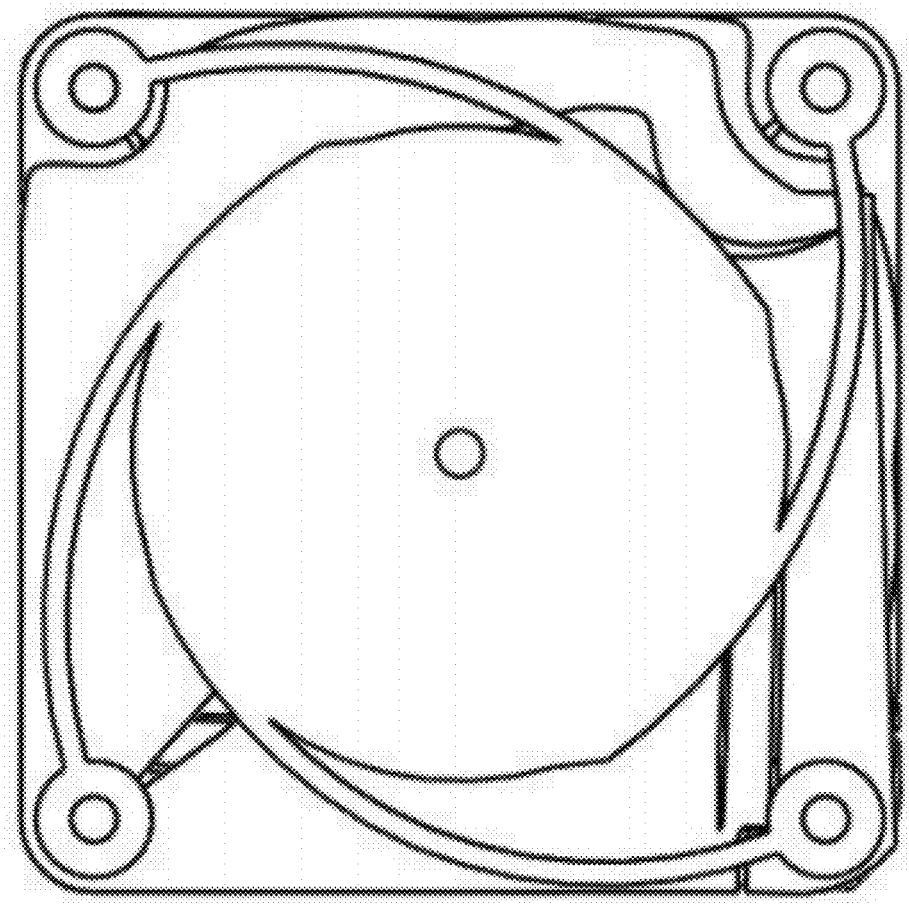
FIG. 23B depicts a compressed unit cell comprising a plurality of links of FIGS. 22A and 22C.
Figure 23C:
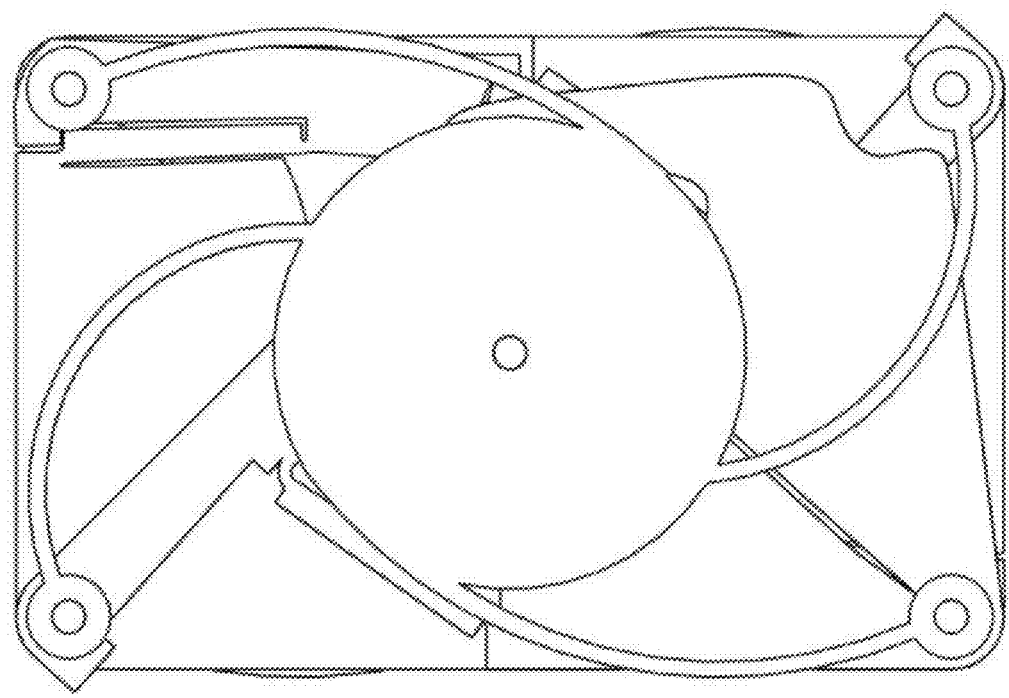
FIG. 23C depicts a unit cell stressed in one direction, the unit cell comprising a plurality of links of FIGS. 22A and 22C.

As depicted in FIG. 22C, the angle Φ of the base plate 12 was found to be 83°. An angle smaller than 83° would not provide sufficient shield coverage in the expanded position, and an angle larger than 83° would force the shield portion 12 to protrude in the unit cell's compressed position. Because the corner angle of the shield 12 is depicted as less than a right angle, though, when assembled into a unit cell, non-linear edges are created in the expanded position, as seen in FIG. 23A.

FIGS. 23A-C depict the unit cell comprising two embodiments of FIG. 22A and four embodiments of FIG. 22C. The top face center-plate can be seen in these figures. The bottom face is mirrored beneath the unit cell. FIG. 23A show the unit cell in its initial expanded position. FIG. 23B shows the unit cell in its fully compressed position. All four of the FIG. 22C embodiments are compressed in this configuration. It can be seen that the final compressed shape forms a square with continuous edges. This is due to the shield angle forming a right angle in its compressed position allowing a complete square. FIG. 23C shows the unit cell in its half-compressed position. Only two of the FIG. 22C embodiments are compressed in this configuration. Shear configurations (not shown) are also contemplated by the current invention, though the sheared configuration may not be stable due to resistance of the center-plates.

A unit cell using center plates and nodes 30 can be useful in multiple ways. One practical use can be passing items such as electrical wires through the center node, providing a safe path that contains no interferences throughout the unit cell's movement. Another practical use is using the center node as a connection point to stack unit cells, allowing each unit cell the ability to move independently while coupled together. This allows three dimensional configurations from planar deformations. For example, consider four interconnected unit cells. The four unit cells make up two sets of two stacked unit cells. Each set of stacked unit cells are connected by their center nodes. The two sets can then be connected side-by-side by outer nodes, forming a 1×2 matrix of unit cells, two layers thick. The matrix remains planar when each of the four unit cells are in their expanded positions. However, when the top plane of each stack (i.e., the two top layer unit cells) is compressed, out-of-plane deformations are formed. This is analogous to the way stress behaves in a beam that experiences pure bending. One side of the beam experiences compressive stress, while the other side experiences tensile stress. The top, compressed layer of unit cells provides tensile forces, while the bottom, expanded layer of unit cells provides compressive forces, resulting in an out-of-plane curved surface.

Another practical use of the center-node unit cell is by using the center node as an input. Since the two center-plates are initially curved, a torsional input to the center-node causes a tensile force exerted on all four outer nodes. This tensile force compresses the unit cell symmetrically. However, since the two center plates are in opposite direction, the center node can only be rigidly attached to one center-plate. Therefore, a square rod can be used as the center node, where one plate has a circular hole while the other has a square cross hole, allowing torsion to be transferred to only one plate.

Analyses of embodiments using these center-nodes, such as force vs. deflection, potential energy, and geometric analysis, is substantially similar to that described previously.

Example Applications

A multistable shape-shifting surface may act as a physical barrier. It has a unique method of mechanical advantage by storing energy within its members to be used in a specific part of its deflection. For example, a shape-shifting surface used in biomedical applications may serve as a barrier against fluids. Thus, it may be important to evaluate barrier effectiveness as a function of the design parameters of the shape-shifting surface. The novel synthesis methodology subdivides the area covered by a unit cell and insures that overlaps prevent gaps in the surface from opening when the surface deforms. This is essentially a line-of-sight synthesis technique, and does not guarantee that the surface is a water-tight barrier. Labyrinth and diaphragm seals enhance the line-of-sight approach. Labyrinth seals make use of the friction in lengthy small passages to minimize and stop fluid flow. An elastomeric flexible membrane forms the barrier in diaphragm seals.

Surface integrity during a shape-shift depends on correct geometric and motion design in synergy with appropriate material choices. By including sensors that monitor the strength and nature of the loads on the surfaces, health monitoring, appropriate repair and, if necessary, redesign and replacement can be conducted to insure that surface integrity is maintained in the short and long term. The inclusion of actuators allows the surface to actively reshape or stiffen itself in order to respond to hazards that threaten the integrity of the surface. For example, with a multistable shape-shifting surface implemented into extreme cold weather roofing systems, damage due to excess snow buildup can be prevented. Strain sensors in an innovative system can determine when the weight of the overlying snow is unsafe, and employ a shapeshift, such as a shrugging motion, to dislocate the snow from the roof while maintaining a physical barrier to keep the snow out of the roofed area.

Shape-shifting surfaces are compatible with finite element modeling. They can be used in the design of a specific planar shape-shift as well as in the design of out-of-plane curvature and flexibility. The ability to expand, contract, shear and form other shapes allows a shape-shifting surface to be useful in many applications, for example collapsible truck beds, trash compactors, general storage containers, etc.

Multistable shape-shifting surfaces are also capable of absorbing and storing energy. Changing a surface from one stable position to another stable position allows external kinetic energy to be stored internally as potential energy within the compliant links. This storing of potential energy can be used, for example, in impact absorption. Allowing surfaces to absorb high impacts by transitioning from a first stable position to a second stable position could save time and money in repair as they can be "fixed" or returned to their initial state by transitioning the unharmed surface back to the first stable shape.

It will thus be seen that the objects set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A shape shifting surface, comprising:
    at least one unit cell including a plurality of layered, adjacent, overlapping compliant side members;
    said side members including compliant flexures and flat plate segments, said compliant flexures including multistable compliant mechanisms;
    said compliant flexures including joints and nodes that have a first position and a second position;
    said first position and said second position of said nodes being substantially within a line of action;
    said compliant side members being joined at said nodes and being pivotal about said nodes; and
    said compliant side members forming a contiguous line of sight barrier in said first position and in said second position.

2. A shape shifting surface as in claim 1, further comprising:
    said at least one unit cell having a quadrilateral shape and including four adjacent compliant side members.

3. A shape shifting surface as in claim 1, further comprising:
    said second position of said nodes being disposed in abutting relation to said plate segments.

4. A shape shifting surface as in claim 1, further comprising:
    each side member of said compliant side members including a first node positioned at a free end of a compliant flexure selected from said compliant flexures and a second node at one corner of said plate segment, said second node being substantially within said line of action of said first node.

5. A shape shifting surface as in claim 1, further comprising:
    said shape shifting surface maintaining a contiguous line of sight barrier when deforming in response to application of a sufficient external force; and
    said deformation shifting said compliant flexures from said first position to said second position.

6. A shape shifting surface as in claim 5, further comprising:
    said shape shifting surface returning to said first position when said application of said sufficient external force is released.

7. A shape shifting surface as in claim 5, further comprising:
    said first position having substantial stability so that said shape shifting surface does not spontaneously shift to said second position; and
    said second position having substantial stability so that said shape shifting surface does not spontaneously shift to said first position.

8. A shape shifting surface as in claim 7, further comprising:
    said first position being an expanded position so that said shape shifting surface has said substantial stability in said expanded position; and
    said second position being a compressed position so that said shape shifting surface has said substantial stability in said compressed position.

9. A shape shifting surface as in claim 7, further comprising:
    all edges of said shape shifting surface remaining substantially within the boundary of said shape shifting surface when said shape shifting surface is in said first position; and
    all edges of said shape shifting surface remaining substantially within the boundary of said shape shifting surface when said shape shifting surface is in said second position.

10. A shape shifting surface as in claim 8, further comprising:
    said deformation shifting said shape shifting surface from said first position to a third position;
    said deformation shifting said shape shifting surface from said second position to said third position;
    said third position being a shearing position.

11. A shape shifting polygon, comprising:
    a first polygonal cell including a first plurality of unit cells;
    said first plurality of unit cells including layered, adjacent, overlapping compliant side members coupled to retain their effectiveness as physical barriers while undergoing changes in shape, said side members including compliant flexures and flat plate segments, said compliant flexures including multistable compliant mechanisms;
    said changes in shape including expansion, shearing, shrinkage, twisting, vibrating, encircling, wiggling, swallowing or constricting;
    said shape shifting polygon having more than one position of substantial stability, said more than one position of substantial stability occurring as a result of said changes in shape,
    said side members forming a contiguous line of sight barrier in said more than one position of substantial stability.

12. A shape shifting polygon as in claim 11, further comprising:
    said compliant flexures disposed at a free end of said side members.

13. A shape shifting polygon as in claim 11, further comprising:

said unit cells including an initial planar structure and a final spatial structure;

said more than one position of stability including said initial planar structure and said final spatial structure.

14. A shape shifting polygon as in claim 11, further comprising:

a second polygonal cell including a second plurality of unit cells;

said second plurality of unit cells including compliant side members coupled to retain their effectiveness as physical barriers while undergoing changes in shape;

said second polygonal cell being coupled to said first polygonal cell.

15. A shape shifting polygon as in claim 14, further comprising:

said second polygonal cell undergoing said changes in shape independently from said first polygonal cell.

16. A shape shifting polygon as in claim 11, further comprising:

said first plurality of unit cells being joined to one another by compliant pin connectors.

17. A shape shifting polygon as in claim 11, further comprising:

a tiled array of polygonal cells including said first polygonal cell.

* * * * *